United States Patent
Wu et al.

(10) Patent No.: US 12,538,217 B2
(45) Date of Patent: Jan. 27, 2026

(54) COMMUNICATION METHOD, COMMUNICATIONS APPARATUS, AND COMMUNICATIONS SYSTEM

(71) Applicant: Huawei Technologies Co., Ltd., Shenzhen (CN)

(72) Inventors: Yedan Wu, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 17/662,120

(22) Filed: May 5, 2022

(65) Prior Publication Data
US 2022/0279432 A1 Sep. 1, 2022

Related U.S. Application Data

(63) Continuation of application No. PCT/CN2019/115943, filed on Nov. 6, 2019.

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC ..... H04W 28/0268; H04W 8/24; H04W 8/22; H04W 8/00; H04W 8/005; H04W 76/10; H04W 76/11; H04W 76/00
See application file for complete search history.

(56) References Cited

U.S. PATENT DOCUMENTS

2011/0222399 A1* 9/2011 Shi .................. H04W 28/18
370/230
2011/0252230 A1 10/2011 Segre et al.

FOREIGN PATENT DOCUMENTS

CN 110213808 A 9/2019
WO 2015148959 A1 10/2015

OTHER PUBLICATIONS

3rd Generation Partnership Project; Technical Speciication Group Services and System Aspects; Study on security for 5GS enhanced support of Vertical and LAN Services; (Release 16), 3GPP TR 33.819, Oct. 2019, 44 Pages, V1.3.0.
Zte Corporation et al., "Consideration on the Sytem Information of the Private Network", 3GPP TSG-RAN WG2 Meeting #107, R2-1909267, Aug. 26-30, 2019, 7 pages, Prague, Czech.
Ericsson, "Further aspects of PNI NPN", 3GPP TSG-RAN WG2 #107-Bis, Tdoc R2-1912361, Oct. 14-18, 2019, 9 pages, Chongqing, China.

(Continued)

*Primary Examiner* — Diana J. Cheng
(74) *Attorney, Agent, or Firm* — Slater Matsil, LLP

(57) ABSTRACT

This application provides a communication method, a communications apparatus, and a communications system. The method includes: A terminal device generates first indication information, where the first indication information is used to indicate a plurality of non-public networks, the plurality of non-public networks include a first non-public network, and the first non-public network is a network that the terminal device requests to access; and the terminal device sends the first indication information to an access network device.

20 Claims, 7 Drawing Sheets

(56) References Cited

OTHER PUBLICATIONS

SA WG2 Meeting #S2-135, 3GPP S2-1908715, "LS on Sending CAG ID in NAS layer", SA3, Oct. 14-18, 2019, Split Croatia, total 1 page.
Ericsson et al., "Support of CAG ID privacy", 3GPP TSG-SA WG2 Meeting #135, Change Request 23.502 CR 1796, rev. 1, Current version: 16.2.0, S2-1910444, Split, Croatia, Oct. 14-18, 2019, 30 pages.
3GPP TS 23.003 V16.0.0 (Sep. 2019), 3rd Generation Partnership Project; Technical Specification Group Core Network and Terminals; Numbering, addressing and identification (Release 16), 134 pages.
Ericsson et al., "Support of CAG ID privacy", 3GPP TSG-SA WG2 Meeting #135, Change Request 23.501 CR 1799 , rev. 1, Current version: 16.2.0,S2-1910443, Split, Croatia, Oct. 14-18, 2019, 4 pages.
3GPP TS 23.501 V15.6.0 (Jun. 2019) 3rd Generation Partnership Project; Technical Specification Group Services and System Aspects; System Architecture for the 5G System; Stage 2 (Release 15), 243 pages.
Qualcomm Inc., "Removing CAG ID from UE to NW RRC signaling", 3GPP TSG-SA WG2 Meeting #135, Change Request 23.502 CR 1732, rev.—, Current version: 16.2.0, S2-1909079, Split, Croatia, Oct. 14-18, 2019, 29 pages.
3GPP TS 38.300 V15.7.0 (Sep. 2019), 3rd Generation Partnership Project; Technical Specification Group Radio Access Network; NR; NR and NG-RAN Overall Description; Stage 2 (Release 15), 99 pages.
3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.
3GPP TS 38.413 V15.5.0 (Sep. 2019), 3rd Generation Partnership Project; Technical Specification Group Radio Access Network; NG-RAN; NG Application Protocol (NGAP) (Release 15), 329 pages.
3GPP TS 38.423 V15.5.0 (Sep. 2019), 3rd Generation Partnership Project; Technical Specification Group Radio Access Network; NG-RAN; Xn application protocol (XnAP) (Release 15), 311 pages.
3GPP TS 38.473 V15.7.0 (Sep. 2019), 3rd Generation Partnership Project; Technical Specification Group Radio Access Network; NG-RAN; F1 application protocol (F1AP) (Release 15), 221 pages.
Huawei et al., "Consideration on connected mode procedures", 3GPP TSG-RAN WG2 Meeting #107bis, R2-1912310, Chongqing, China, Oct. 14-18, 2019, 6 pages.
Huawei, "CR to TS 38.423 on support of NPN", 3GPP TSG-RAN WG3 Meeting #105, R3-194415, Change Request 38.423, CR 0212, Current version: 15.4.0, Ljubljana, Slovenia, Aug. 26-30, 2019, 24 pages.
Huawei, "CR to TS 38.413 on support of NPN", 3GPP TSG-RAN WG3 Meeting #105, R3-194416, Change Request 38.413, CR 0230, Current version: 15.4.0, Ljubljana, Slovenia, Aug. 26-30, 2019, 30 pages.
Huawei, "CR to TS 38.300 on support of NPN" 3GPP TSG-RAN3 Meeting #105, R3-194417, Change Request, 38.300 CR, Current version: V15.6.0, Ljubljana, Slovenia, Aug. 26-30, 2019, 6 pages.
Huawei et al., "General support of NPN over F1", 3GPP TSG-RAN WG3 Meeting #105, R3-194485, Ljubljana, Slovenia, Aug. 26-30, 2019, 5 pages.
Nokia et al., "Update of baseline TR33.819—editorial", 3GPP TSG SA WG3 #96, S3-192594, Wroclaw, Poland, Aug. 26-30, 2019, 40 pages.
CMCC, "Left issues in idle and inactive mode for NPN", 3GPP TSG RAN WG2 #107bis, R2-1912924, Chongqing, China, Oct. 14-18, 2019, 10 pages.

\* cited by examiner

COMMUNICATION METHOD, COMMUNICATIONS APPARATUS, AND COMMUNICATIONS SYSTEM

CROSS-REFERENCE TO RELATED APPLICATIONS

This application is a continuation of International Application No. PCT/CN2019/115943, filed on Nov. 6, 2019, the disclosure of which is hereby incorporated by reference in its entirety.

TECHNICAL FIELD

This application relates to the field of communications technologies, and in particular, to a communication method, a communications apparatus, and a communications system.

BACKGROUND

To improve communication efficiency and reduce communication costs, a concept of network sharing is put forward in recent years. To be specific, different network operators may share a same base station, and different network operators may build a plurality of different types of networks such as a public land mobile network (PLMN), a stand-alone non-public network (SNPN), and a non-stand-alone non-public network (CAG) in a same cell of a same base station.

For a cell in which network sharing exists, in a process of accessing a CAG network in the cell, a terminal device in an idle mode needs to report an identity of the CAG network to a base station through a radio resource control (RRC) setup complete message, so that the base station can learn of a connection status between the CAG network and the terminal device (for example, learn of a quantity of accessed terminal devices). The base station may determine, based on the connection status, whether to allow a new terminal device to access the CAG network, and may properly allocate a resource to a terminal device in the CAG network based on the connection status.

However, the RRC setup complete message is not encrypted. Consequently, the identity of the CAG network that is reported by the terminal device is likely to be intercepted, resulting in a security risk.

SUMMARY

This application provides a communication method, a communications apparatus, and a communications system, to securely and reliably indicate, to a base station, a non-public network accessed by a terminal device.

According to a first aspect, a communication method is provided. The method may be performed by a terminal device, or may be performed by a chip or a circuit disposed in the terminal device. This is not limited in this application.

Specifically, the method includes: A terminal device generates first indication information, where the first indication information is used to indicate a plurality of non-public networks, the plurality of non-public networks include a first non-public network, and the first non-public network is a network that the terminal device requests to access; and the terminal device sends the first indication information to an access network device.

In this application, the first indication information is used to indicate the plurality of non-public networks including the first non-public network, and which one of the plurality of non-public networks is the first non-public network cannot be determined by using only content of the first indication information. In this way, even if the first indication information is intercepted by a criminal, the specific network that the terminal device requests to access cannot be determined, so that an identity of a user is not exposed, and use security of the network is improved.

Optionally, all the plurality of non-public networks may be non-stand-alone non-public networks.

Optionally, all the plurality of non-public networks may be stand-alone non-public networks.

Optionally, the plurality of non-public networks may include both a non-stand-alone non-public network and a stand-alone non-public network.

Optionally, the plurality of non-public networks may rely on a same public network.

Optionally, the plurality of non-public networks may rely on different public networks.

Optionally, the first indication information is carried in an RRC setup complete message.

Optionally, the first indication information may alternatively be carried in other signaling, or may be separately sent. This is not limited in this application.

With reference to the first aspect, in some implementations of the first aspect, the first indication information includes indication information of each of the plurality of non-public networks.

Optionally, before the terminal device generates the first indication information, the terminal device may first determine the plurality of non-public networks, and generate the first indication information based on the plurality of non-public networks. In addition to the first non-public network, the plurality of non-public networks further include at least one other non-public network. Therefore, the terminal device may first determine another non-public network in the plurality of non-public networks. The terminal device may randomly determine the another non-public network. This is not limited in this application.

For example, a non-public network other than the first non-public network in a cell may be determined as the another non-public network.

For another example, in non-public networks other than the first non-public network in a cell, a non-public network having a same type as the first non-public network may be determined as the another non-public network.

For another example, in non-public networks other than the first non-public network in a cell, a non-public network relying on a same public network as the first non-public network may be determined as the another non-public network.

For another example, in non-public networks other than the first non-public network in a cell, a non-public network having a same type as the first non-public network and relying on a same public network as the first non-public network may be determined as the another non-public network.

Optionally, the terminal device may receive a broadcast message in the cell, and determine the another non-public network other than the first non-public network in the plurality of non-public networks based on a system information block (for example, a system information block 1 (SIB1)) in the broadcast message.

With reference to the first aspect, in some implementations of the first aspect, the indication information of each non-public network includes an identity of the non-public network or an index of the non-public network.

In addition, hybrid reporting may be alternatively used. To be specific, some of the plurality of non-public networks are indicated by using non-public network identities, and remaining non-public networks are indicated by using non-public network indices. This is not limited in this application.

With reference to the first aspect, in some implementations of the first aspect, the first indication information specifically includes non-public network access indication information and indication information of a first network, the non-public network access indication information is used to indicate that the network that the terminal device requests to access is a non-public network, the first network is a network on which the first non-public network relies, and the plurality of non-public networks are non-public networks relying on the first network.

After receiving the first indication information, the access network device can determine a type of a non-public network based on the non-public network access indication information, and determine the first network based on the indication information of the first network. The access network device may determine non-public networks of a corresponding type in the first network as the plurality of non-public networks. In other words, the first indication information may indirectly indicate the plurality of non-public networks.

Optionally, a type of the first non-public network is a non-stand-alone non-public network, and the non-public network access indication information is used to indicate that the network that the terminal device requests to access is a non-stand-alone non-public network. The plurality of non-public networks are all non-stand-alone non-public networks relying on the first network. After receiving the first indication information, the access network device determines all the non-stand-alone non-public networks relying on the first network in the cell as the plurality of non-public networks.

Optionally, a type of the first non-public network is a stand-alone non-public network, and the non-public network access indication information is used to indicate that the network that the terminal device requests to access is a stand-alone non-public network. The plurality of non-public networks are all stand-alone non-public networks relying on the first network. After receiving the first indication information, the access network device determines all the stand-alone non-public networks relying on the first network in the cell as the plurality of non-public networks.

Optionally, the type of the first non-public network is a non-stand-alone non-public network or a stand-alone non-public network, the non-public network access indication information is used to indicate that the network that the terminal device requests to access is a non-public network (that is, the network is indicated as only a non-public network but is not specifically indicated as a non-stand-alone non-public network or a stand-alone non-public network), and the plurality of non-public networks are all non-public networks (including a stand-alone non-public network and a non-stand-alone non-public network) relying on the first network. After receiving the first indication information, the access network device determines all the non-public networks relying on the first network in the cell as the plurality of non-public networks.

Optionally, the non-public network access indication information is used to indicate that the network that the terminal device requests to access is a non-public network (that is, the network is indicated as only a non-public network but is not specifically indicated as a non-stand-alone non-public network or a stand-alone non-public network), and the indication information of the first network is used to determine the first network that the terminal device requests to access and a type of a non-public network in the first network. The access network device receives the first indication information and the indication information of the first network, and determines corresponding non-public networks relying on the first network in the cell as the plurality of non-public networks.

Optionally, according to a stipulation in a protocol or a system, the non-public network access indication information may be a string of specific code, or may be 1-bit "0" or "1".

For example, 1-bit "1" may be used to indicate that the network that the terminal device requests to access is a non-stand-alone non-public network, and 1-bit "0" may be used to indicate that the network that the terminal device requests to access is a stand-alone non-public network. After receiving the non-public network access indication information, the access network device determines, based on a value of a corresponding bit, whether the network (that is, the first non-public network) that the terminal device requests to access is a non-stand-alone non-public network or a stand-alone non-public network.

In addition, the non-public network access indication information may alternatively be an implicit indication. This is not limited in this application.

The first network is a network on which the first non-public network relies. For example, the first network may be a public network.

Optionally, the indication information of the first network may include an identity or an index of the first network.

Optionally, the indication information of the first network may include an identity of any non-public network other than the first non-public network in the first network in the cell. According to a stipulation in a system or a protocol, after receiving the identity of the non-public network, the access network device determines the first network based on a PLMN ID in the identity of the non-public network, and automatically ignores a subsequent CAG ID or NID. An advantage of the foregoing setting is that a criminal may be confused, and an incorrect non-public network identity is presented to the criminal, to palm off falsehood as truth.

According to a second aspect, a communication method is provided. The method may be performed by an access network device, or may be performed by a chip or a circuit disposed in the access network device. This is not limited in this application.

Specifically, the method includes: An access network device receives first indication information sent by a terminal device, where the first indication information is used to indicate a plurality of non-public networks, the plurality of non-public networks include a first non-public network, and the first non-public network is a network that the terminal device requests to access; the access network device determines second indication information based on the first indication information, where the second indication information indicates the plurality of non-public networks; the access network device sends the second indication information to a core network device; and the access network device receives third indication information sent by the core network device, where the third indication information indicates the first non-public network.

With reference to the second aspect, in some implementations of the second aspect, the first indication information includes indication information of each of the plurality of non-public networks.

With reference to the second aspect, in some implementations of the second aspect, the indication information of each non-public network includes an identity of the non-public network or an index of the non-public network.

With reference to the second aspect, in some implementations of the second aspect, the first indication information specifically includes non-public network access indication information and indication information of a first network, the non-public network access indication information is used to indicate that the network that the terminal device requests to access is a non-public network, the first network is a network on which the first non-public network relies, and the plurality of non-public networks are non-public networks relying on the first network; and that the access network device determines second indication information based on the first indication information includes: The access network device determines the plurality of non-public networks based on the non-public network access indication information and the indication information of the first network.

With reference to the second aspect, in some implementations of the second aspect, the second indication information includes the indication information of each of the plurality of non-public networks.

Optionally, the indication information of each non-public network includes an identity or an index of the non-public network.

Optionally, content of the second indication information may be the same as content of the first indication information. In this case, the access network device may play a "forwarding" role.

Optionally, content of the second indication information may alternatively be different from that of the first indication information.

For example, the first indication information includes indices of the plurality of non-public networks, but the second indication information may include identities of the plurality of non-public networks. This is not limited in this application.

Optionally, the second indication information may be carried in an initial terminal device message.

Optionally, the second indication information may alternatively be carried in other RRC signaling, or may be separately sent. This is not limited in this application.

According to a third aspect, a communication method is provided. The method may be performed by a core network device, or may be performed by a chip or a circuit disposed in the core network device. This is not limited in this application. The method includes:

A core network device receives second indication information sent by an access network device, where the second indication information indicates a plurality of non-public networks, the plurality of non-public networks include a first non-public network, and the first non-public network is a network that a terminal device requests to access; the core network device determines the first non-public network based on the plurality of non-public networks and subscription information of the terminal device; and the core network device sends third indication information to the access network device, where the third indication information indicates the first non-public network.

Specifically, the core network device may obtain the subscription information of the terminal device, and the core network device can determine, based on the subscription information, specific networks in which the terminal device has been authenticated in a cell, or specific networks that the terminal device can access in a cell. The network herein includes a public network, a non-stand-alone non-public network, a stand-alone non-public network, or the like.

Generally, for a cell having a plurality of non-public networks, the terminal device is usually authenticated in only one of the non-public networks, or in other words, the terminal device can usually access only one non-public network in the cell.

Therefore, after obtaining the subscription information of the terminal device, the core network device determines, based on the subscription information, a specific non-public network that is in the plurality of non-public networks indicated by the second indication information and in which the terminal device is authenticated. Then, the non-public network in which the terminal device is authenticated is determined as the first non-public network, and is indicated to the access network device.

Optionally, the third indication information is carried in an initial context setup request message.

Optionally, the third indication information may alternatively be carried in other RRC signaling, or may be separately sent. This is not limited in this application.

Optionally, the third indication information includes an identity or an index of the first non-public network.

With reference to the third aspect, in some implementations of the third aspect, the second indication information includes indication information of each of the plurality of non-public networks.

According to a fourth aspect, a communications apparatus is provided. The apparatus includes: a generation unit, configured to generate first indication information, where the first indication information is used to indicate a plurality of non-public networks, the plurality of non-public networks include a first non-public network, and the first non-public network is a network that the communications apparatus requests to access; and a sending unit, configured to send the first indication information to an access network device.

With reference to the fourth aspect, in some implementations of the fourth aspect, the first indication information includes indication information of each of the plurality of non-public networks.

With reference to the fourth aspect, in some implementations of the fourth aspect, the indication information of each non-public network includes an identity of the non-public network or an index of the non-public network.

With reference to the fourth aspect, in some implementations of the fourth aspect, the first indication information specifically includes non-public network access indication information and indication information of a first network, the non-public network access indication information is used to indicate that the network that the communications apparatus requests to access is a non-public network, the first network is a network on which the first non-public network relies, and the plurality of non-public networks are non-public networks relying on the first network.

According to a fifth aspect, a communications apparatus is provided. The apparatus includes: a receiving unit, configured to receive first indication information sent by a terminal device, where the first indication information is used to indicate a plurality of non-public networks, the plurality of non-public networks include a first non-public network, and the first non-public network is a network that the terminal device requests to access; a determining unit, configured to determine second indication information based on the first indication information, where the second indication information indicates the plurality of non-public networks; and a sending unit, configured to send the second indication information to a core network device. The receiving unit is further configured to receive third indication information sent by the core network device, where the third indication information indicates the first non-public network.

With reference to the fifth aspect, in some implementations of the fifth aspect, the first indication information includes indication information of each of the plurality of non-public networks.

With reference to the fifth aspect, in some implementations of the fifth aspect, the indication information of each non-public network includes an identity of the non-public network or an index of the non-public network.

With reference to the fifth aspect, in some implementations of the fifth aspect, the first indication information specifically includes non-public network access indication information and indication information of a first network, the non-public network access indication information is used to indicate that the network that the terminal device requests to access is a non-public network, the first network is a network on which the first non-public network relies, and the plurality of non-public networks are non-public networks relying on the first network; and the determining unit is further configured to determine the plurality of non-public networks based on the non-public network access indication information and the indication information of the first network.

With reference to the fifth aspect, in some implementations of the fifth aspect, the second indication information includes the indication information of each of the plurality of non-public networks.

According to a sixth aspect, a communications apparatus is provided. The apparatus includes: a receiving unit, configured to receive second indication information sent by an access network device, where the second indication information indicates a plurality of non-public networks, the plurality of non-public networks include a first non-public network, and the first non-public network is a network that a terminal device requests to access; a determining unit, configured to determine the first non-public network based on the plurality of non-public networks and subscription information of the terminal device; and a sending unit, configured to send third indication information to the access network device, where the third indication information indicates the first non-public network.

With reference to the sixth aspect, in some implementations of the sixth aspect, the second indication information includes indication information of each of the plurality of non-public networks.

According to a seventh aspect, a communications apparatus is provided. The apparatus may be a terminal device or a chip in the terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs the method in the first aspect. When the apparatus is the chip in the terminal device, the processing unit may be a processor, and the transceiver unit may be an input/output interface, a pin, a circuit, or the like. The processing unit executes instructions stored in a storage unit, so that the terminal device performs the method in the first aspect. The storage unit may be a storage unit (for example, a register or a cache) in the chip, or may be a storage unit (for example, a read-only memory or a random access memory) that is in the terminal device and that is outside the chip.

According to an eighth aspect, a communications apparatus is provided. The apparatus may be an access network device or a chip in the access network device. The apparatus may include a processing unit and a transceiver unit. When the apparatus is the access network device, the processing unit may be a processor, and the transceiver unit may be a transceiver. The access network device may further include a storage unit, and the storage unit may be a memory. The storage unit is configured to store instructions, and the processing unit executes the instructions stored in the storage unit, so that the network device performs the method in the second aspect. When the apparatus is the chip in the network device, the processing unit may be a processor, and the transceiver unit may be an input/output interface, a pin, a circuit, or the like. The processing unit executes instructions stored in a storage unit, so that the network device performs the method in the second aspect. The storage unit may be a storage unit (for example, a register or a cache) in the chip, or may be a storage unit (for example, a read-only memory or a random access memory) that is in the access network device and that is outside the chip.

According to a ninth aspect, a communications apparatus is provided. The apparatus may be a core network device or a chip in the core network device. The apparatus may include a processing unit and a transceiver unit. When the apparatus is the core network device, the processing unit may be a processor, and the transceiver unit may be a transceiver. The core network device may further include a storage unit, and the storage unit may be a memory. The storage unit is configured to store instructions, and the processing unit executes the instructions stored in the storage unit, so that the network device performs the method in the third aspect. When the apparatus is the chip in the core network device, the processing unit may be a processor, and the transceiver unit may be an input/output interface, a pin, a circuit, or the like. The processing unit executes instructions stored in a storage unit, so that the network device performs the method in the third aspect. The storage unit may be a storage unit (for example, a register or a cache) in the chip, or may be a storage unit (for example, a read-only memory or a random access memory) that is in the access network device and that is outside the chip.

According to a tenth aspect, a communications apparatus is provided, and includes at least one processor. The at least one processor is configured to: be coupled to a memory, and read and execute instructions in the memory, to implement any method in the first aspect.

Optionally, the communications apparatus further includes the memory.

According to an eleventh aspect, a communications apparatus is provided, and includes at least one processor. The at least one processor is configured to: be coupled to a memory, and read and execute instructions in the memory, to implement any method in the second aspect.

Optionally, the communications apparatus further includes the memory.

According to a twelfth aspect, a communications apparatus is provided, and includes at least one processor. The at least one processor is configured to: be coupled to a memory, and read and execute instructions in the memory, to implement any method in the third aspect.

Optionally, the communications apparatus further includes the memory.

According to a thirteenth aspect, a computer program product is provided. The computer program product includes computer program code, and when the computer program code is run on a computer, the computer is enabled to perform the method in the first aspect, the second aspect, or the third aspect.

It should be noted that the foregoing computer program code may be completely or partially stored in a first storage medium. The first storage medium may be packaged with a processor or packaged separately from the processor. This is not specifically limited in this application.

According to a fourteenth aspect, a computer-readable medium is provided. The computer-readable medium stores program code, and when the computer program code is run on a computer, the computer is enabled to perform the method in the first aspect, the second aspect, or the third aspect.

According to a fifteenth aspect, a chip system is provided, including a processor, configured to invoke a computer program from a memory and run the computer program, so that a communications device on which the chip system is installed performs the method in the first aspect, the second aspect, or the third aspect.

According to a sixteenth aspect, a communications system is provided, and the communications system includes at least one of the communications apparatus provided in the fourth aspect, the communications apparatus provided in the fifth aspect, and the communications apparatus provided in the sixth aspect.

DETAILED DESCRIPTION OF ILLUSTRATIVE EMBODIMENTS

The following describes the technical solutions of this application with reference to the accompanying drawings.

The technical solutions in embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) communications system, or a future new radio access technology (NR).

Figure 1:
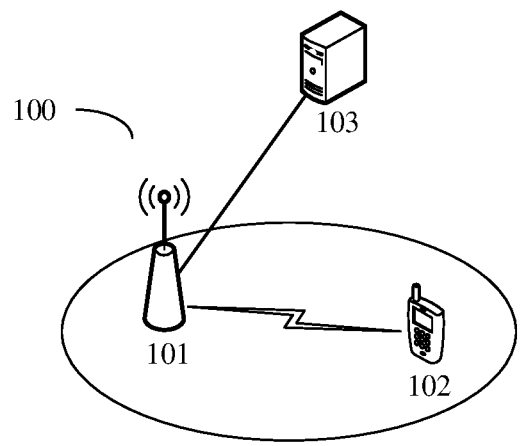
FIG. 1 is a schematic diagram of a communications system according to an embodiment of this application.

For ease of understanding of embodiments of this application, a communications system shown in FIG. 1 is first used as an example to describe in detail a communications system applicable to embodiments of this application. FIG. 1 is a schematic diagram of a communications system 100 to which a communication method according to an embodiment of this application is applicable. As shown in FIG. 1, the communications system 100 may include at least one access network device (for example, an access network device 101 shown in FIG. 1) and at least one terminal device (for example, a terminal device 102 shown in FIG. 1). The access network device 101 may perform wireless communication with the terminal device 102. Optionally, the communications system 100 may alternatively include more access network devices and/or more terminal devices. This is not limited in this application.

Further, as shown in FIG. 1, the communications system 100 provided in this application further includes at least one core network device (for example, a core network device 103 shown in FIG. 1). The core network device 103 may be communicatively connected to the access network device 101 (for example, in a wired manner). Optionally, the communications system 100 may alternatively include more core network devices. This is not limited in this application.

The access network device may include a device that communicates with a wireless terminal over an air interface in an access network by using one or more sectors. An access network system may be configured to perform mutual conversion between a received over-the-air frame and an Internet protocol (IP) packet, and serve as a router between the wireless terminal and a rest part of the access network. The rest part of the access network may include an IP network. A radio access network system may further coordinate attribute management for the air interface. It should be understood that the access network device includes but is not limited to: an evolved NodeB (eNB), a radio network controller (RNC), a NodeB (NB), a base station controller (BSC), a base transceiver station (BTS), a home base station (for example, Home evolved NodeB or Home NodeB, HNB), a baseband unit (BBU), an access point (AP) in a wireless fidelity (Wireless Fidelity, Wi-Fi) system, a wireless relay node, a wireless backhaul node, a transmission and reception point (transmission and reception point (TRP), or transmission point (TP)), or the like. The access network device may alternatively be a gNB or a transmission point (TRP or TP) in a 5G system, for example, an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC signaling may be considered as being sent by the DU or sent by the DU and the CU. It may be understood that the access network device may be a CU node, a DU node, or a device including the CU node and the DU node. In addition, the CU may be classified into an access network device in a radio access network (RAN), or the CU may be classified into an access network device in a core network (CN). This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in embodiments of this application may be a mobile phone, a tablet computer (Pad), a computer having wireless sending and receiving functions, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application.

The core network device is a device in a core network (CN) that provides service support for the terminal device. The core network device in embodiments of this application may be configured to implement functions such as call connection, charging, mobility management, and a supplementary service. In a 5G system, the core network device may include, for example, an access and mobility management function (AMF) entity, a session management function (SMF) entity, or a user plane function (UPF) entity. Embodiments of this application mainly relate to communication with an AMF entity. Therefore, brief descriptions of the AMF entity are provided herein. The AMF entity may also be referred to as an AMF for short, is mainly used for mobility management, access management, and the like, and may be configured to implement another function, other than session management, in mobility management entity (MME) functions, for example, a lawful interception function and an access authorization (or authentication) function. The following uses the AMF in 5G as an example of a network element used for mobility and access management. This shall not constitute any limitation on this application. This application does not exclude a possibility of replacing the AMF with another network element to implement same or similar functions. It should be noted that the entity in embodiments of this application may also be referred to as a network element or a function entity. For example, the AMF entity may also be referred to as an AMF network element or an AMF function entity.

For ease of understanding of embodiments of this application, some technical concepts and communication procedures that may be used in this application are first described by using examples.

1. Public Network

Usually, the public network provides a network service for a terminal device. The public network is a public land mobile network (PLMN) built and operated by the government or an operator approved by the government to provide land mobile communication services for the public. The network is usually connected to a public switched telephone network (PSTN) to form a regional or national communications network.

Different PLMN identities (ID) may be used to distinguish between different PLMNs. A PLMN identity includes a mobile country code (MCC) and a mobile network code (MNC). The MCC uniquely identifies the country to which a mobile subscriber belongs. For example, the MCC of China is 460. The MNC uniquely identifies a network in the country. For example, the MNC of China Mobile is 00, and the MNC of China Unicom is 01.

2. Non-Public Network

In addition to public networks, operators or private users also build some non-public networks (NPN) to satisfy user requirements. The non-public network may also be referred to as a private network, and is a network that is open to a specific user, for example, an internal network built by a company, a school, or a factory. A terminal device that is not subscribed to the non-public network is not allowed to access the non-public network. Non-public networks are classified into non-stand-alone non-public networks and stand-alone non-public networks.

(1) Non-Stand-Alone Non-Public Network

A network resource (for example, an access network device, a core network device, or a spectrum resource) used by the non-stand-alone non-public network (non-stand-alone non-public network, NSA-NPN, or public network integrated non-public network, PNI-NPN) is a part of the public network. It may also be considered that the non-stand-alone non-public network relies on (rely on) the public network, or the non-stand-alone non-public network is based on the public network. The non-stand-alone non-public network is also referred to as a closed access group (CAG). An identity of the non-stand-alone non-public network includes two parts: a PLMN ID and a CAG ID, where the PLMN ID of the non-stand-alone non-public network is consistent with that of the public network on which the non-stand-alone non-public network relies. For a plurality of non-stand-alone non-public networks relying on a same public network, each non-stand-alone non-public network has a unique CAG ID. In other words, the plurality of non-stand-alone non-public networks relying on the same public network may be distinguished by using only CAG IDs.

For example, an identity of a non-stand-alone non-public network #1 may be represented as PLMN #1 and CAG #1.

An identity of a non-stand-alone non-public network #2 may be represented as PLMN #1 and CAG #2.

In other words, both the non-stand-alone non-public network #1 and the non-stand-alone non-public network #2 are non-public networks built relying on a public network whose identity is PLMN #1. In some occasions, the foregoing two non-public networks may be distinguished by using only CAG #1 and CAG #2.

According to a current communication protocol, because a CAG network uses resources of a public network, handover and cell reselection may be performed on a terminal device between the CAG network and the public network. The handover means that under control of a base station, a terminal device in a connected mode is disconnected from a current serving cell, and is connected to a target cell. The cell reselection means that after a terminal device in an idle mode/inactive mode camps on a cell, as the terminal device moves, the terminal device may need to change to camp on another cell with a higher priority or better signal quality. This is a cell reselection process.

(2) Stand-Alone Non-Public Network

The stand-alone non-public network (SNPN) is a non-public network that may not rely on a network function of the public network. Similarly, an identity of the stand-alone non-public network is also divided into two parts: a PLMN ID and an NID. For a stand-alone non-public network relying on the public network, a PLMN ID of the stand-alone non-public network is consistent with that of the public network on which the stand-alone non-public network relies. For a stand-alone non-public network (which may be, for example, deployed by an enterprise) that does not rely on the public network, an MCC of a PLMN ID of the stand-alone non-public network is 999. For a plurality of stand-alone non-public networks relying on a same public network, each non-stand-alone non-public network has a unique NID. In other words, the plurality of stand-alone non-public networks relying on the same public network may be distinguished by using only NIDs.

For example, an identity of a stand-alone non-public network #1 may be represented as PLMN #1 and NID #1.

An identity of a stand-alone non-public network #2 may be represented as PLMN #1 and NID #2.

An identity of a stand-alone non-public network #3 may be represented as PLMN #3 (MCC=999) and NID #1.

In other words, both the stand-alone non-public network #1 and the stand-alone non-public network #2 are non-public networks built relying on a public network whose identity is PLMN #1. In some occasions, the foregoing two non-public networks may be distinguished by using only NID #1 and NID #2.

In addition, the MCC of the PLMN ID of the stand-alone non-public network #3 is 999, and this indicates that the stand-alone non-public network #3 is a stand-alone non-public network deployed by an enterprise or the like without help of an operator.

In a possible manner, the stand-alone non-public network does not support handover or cell reselection of a terminal device between the stand-alone non-public network and any one of a public network, a non-stand-alone non-public network, and another stand-alone non-public network. To be specific, a terminal device in a connected mode cannot be handed over from a cell of the stand-alone non-public network to a cell of the public network, a cell of the non-stand-alone non-public network, or a cell of the another stand-alone non-public network, and vice versa. A terminal device in an idle/inactive mode cannot be reselected from a cell of the stand-alone non-public network to a cell of the public network, and vice versa. It may be understood that, in another possible implementation, the stand-alone non-public network may support handover and cell reselection of a terminal device between the stand-alone non-public network and any one of a public network, a non-stand-alone non-public network, and another stand-alone non-public network.

3. RRC Mode

Figure 2:
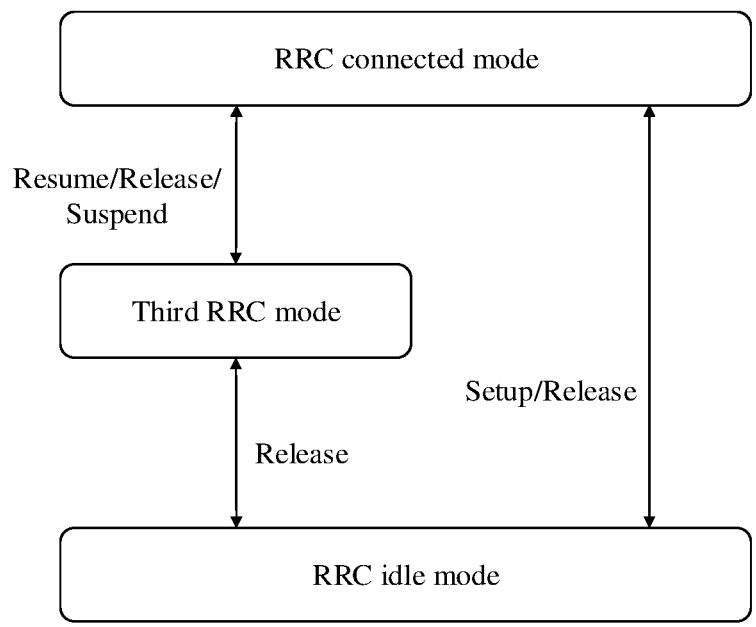
FIG. 2 is a schematic diagram of a switching relationship between three RRC modes according to an embodiment of this application.

In a 5G system, RRC modes of a terminal device include an RRC connected mode (RRC_CONNECTED), an RRC inactive mode or a third RRC mode (RRC_INACTIVE), and an RRC idle mode (RRC_IDLE). FIG. 2 is a schematic diagram of a switching relationship between three RRC modes.

When the terminal device is in the RRC connected mode, the terminal device has established links to both a base station and a core network, and when data arrives at a network, the data may be directly transmitted to the terminal device. When the terminal device is in the third RRC mode (or the RRC inactive mode), it indicates that the terminal device established the links to the base station and the core network, but the link from the terminal device to the base station is released. Although the link is released, the base station stores a context of the terminal device. When data needs to be transmitted, the base station may quickly restore the link. When the terminal device is in the RRC idle mode, there is no link between the terminal device and the base station or the core network. When data needs to be transmitted, links from the terminal device to the base station and the core network need to be established.

4. Random Access

In a 5G system, a random access process is usually required in the following cases: a case in which a terminal device performs initial access and switches from an idle mode/an inactive mode to a connected mode; a case of reestablishing an RRC connection after a wireless connection is interrupted; a case in which a terminal device needs to establish uplink synchronization with a target cell during handover; a case in which uplink data or downlink data arrives when a terminal device is in a connected mode but the terminal device is not uplink-synchronized, and uplink synchronization needs to be established through random access; a case of performing user positioning based on uplink measurement; and a case of applying for an uplink resource through random access when no dedicated scheduling request resource is allocated on a physical uplink control channel (PUCCH).

Figure 3:
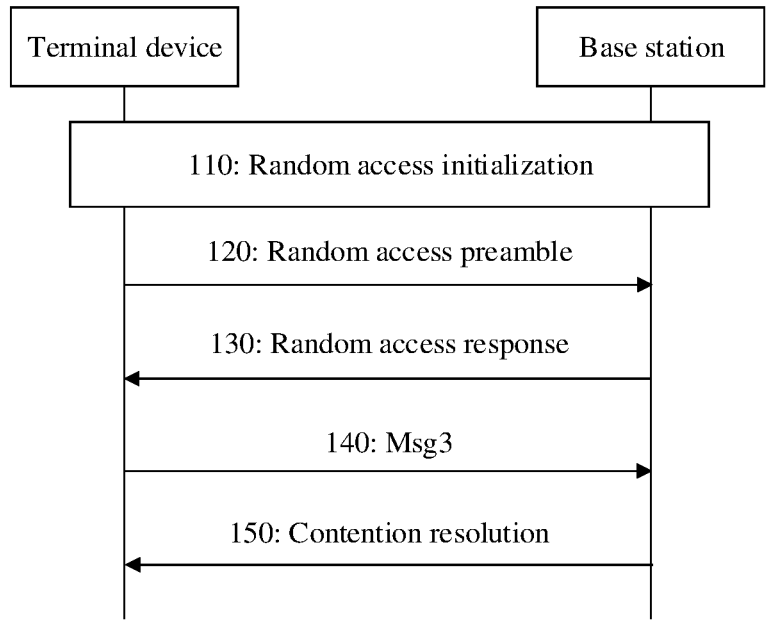
FIG. 3 is a flowchart of four-step contention-based random access according to an embodiment of this application.

Random access types include contention-based random access, contention-free random access, four-step random access, two-step random access, and the like. FIG. 3 is a flowchart of four-step contention-based random access.

110: Perform random access initialization.

120: A terminal device sends a random access preamble to a base station.

The random access preamble is carried in a first message (Msg1). A main function of the random access preamble is to notify the base station that there is a random access request, so that the base station can estimate a transmission latency between the base station and the terminal device. In this way, the base station can calibrate an uplink timing and notify the terminal device of calibration information by using a timing advance command.

130: The terminal device receives a random access response (random access response, RAR) sent by the base station.

The RAR is carried in a second message (Msg2). After sending the preamble, the terminal device monitors a corresponding physical downlink control channel (PDCCH) in an RAR response window based on a random access radio network temporary identifier (RA-RNTI) corresponding to the preamble. If a preamble carried in the response received by the terminal device is consistent with the preamble sent in the Msg1, the terminal device stops monitoring an RAR. The RAR includes an uplink timing advance, an uplink grant (UL grant) allocated to a third message (Msg3), a temporary cell radio network temporary identifier (cell radio network temporary identifier, temporary C-RNTI) allocated by a network side, and the like.

140: The terminal device sends a message (namely, Msg3) that is based on scheduled transmission to a network device.

The terminal device sends the Msg3 to the base station based on the uplink grant and the uplink timing advance information in the Msg2. Herein, content of the Msg3 may be different based on different states of the terminal device and different application scenarios.

The Msg3 may be classified into the following types: an RRC connection request, a tracking area data update, a resource scheduling request, and the like.

150: The terminal device receives a contention resolution, that is, a fourth message Msg4, sent by the network device.

Contention occurs when a plurality of terminal devices use a same preamble to initiate random access. A maximum of only one terminal device in the terminal devices contending for a same resource can succeed in accessing. In this case, the base station sends a contention resolution message to the terminal device through a physical downlink shared channel (PDSCH). If the terminal device receives the contention resolution message sent by the base station to the terminal device, it is considered that the random access process succeeds.

5. RRC Connection Setup Procedure

Figure 4:
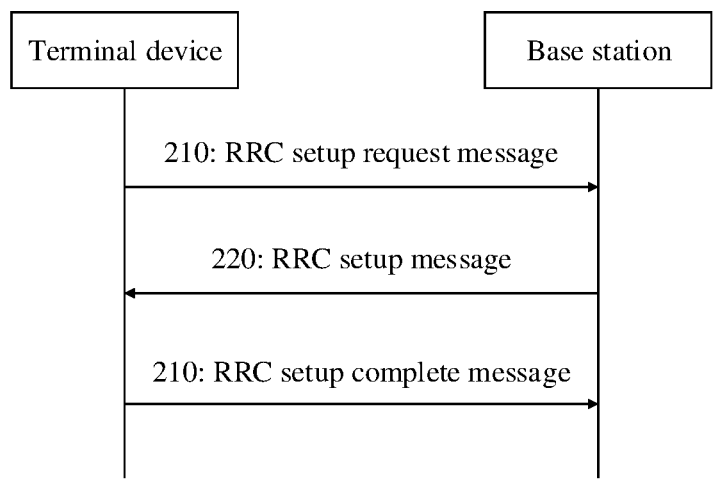
FIG. 4 is a flowchart of an RRC connection setup procedure according to an embodiment of this application.

To enter a connected mode, a terminal device in an idle mode needs to initiate an RRC connection setup procedure. FIG. 4 is a flowchart of an RRC connection setup procedure. As shown in FIG. 4, the RRC connection setup procedure includes the following three steps.

Step 210: A terminal device sends an RRC setup request (RRCSetupRequest) message to a base station, to request to set up an RRC connection to the base station. The RRC setup request message carries information such as an identifier of the terminal device and a connection setup reason.

Optionally, the RRC setup request message may be the foregoing third message (Msg3).

Step 220: The base station sends an RRC setup (RRCSetup) message to the terminal device. If the base station determines, based on the RRC connection setup reason, a system resource status, and the like, to agree to set up the RRC connection to the terminal device, the base station sends the RRC setup message to the terminal device, where the RRC setup message carries a series of configuration information.

Optionally, the RRC setup message may be the foregoing fourth message (Msg4).

Step 230: The terminal device sends an RRC setup complete (RRCSetupComplete) message to the base station. The terminal device performs configuration based on the series of configuration information, and sends the RRC setup complete message to the base station after determining that the RRC connection is successfully set up. In this way, the RRC connection setup procedure ends, and the terminal device starts to send an attach message.

Alternatively, in step 220, if the base station determines that the RRC connection request cannot be set up this time (for example, resources are insufficient), the base station may send an RRC reject message to the terminal device, where the RRC reject message may indicate an RRC connection reject reason.

6. System Information Reading

A base station broadcasts a master information block (master information block, MIB) to all terminal devices in a cell.

The terminal device may determine, based on the MIB (specifically, based on scheduling information of a SIB), specific time-frequency resources on which a system information block 1 (SIB1) is to be searched for. When finding the SIB1, the terminal device can determine information such as a PLMN ID and a tracking area code (TAC) of a current cell. Optionally, the terminal device can further determine information such as a non-stand-alone non-public network identity or a stand-alone non-public network identity of the cell.

7. Network Sharing

Different network operators may share a same network device. According to an existing protocol, the network device herein is an access network device, that is, a base station (for example, a gNB). Different network operators have different PLMN IDs. Networks built by these operators each may be a PLMN (public network), a CAG (non-stand-alone non-public network), or an SNPN (stand-alone non-public network). The SNPN may alternatively be deployed by an enterprise or the like. In this case, an MCC of a PLMN ID of the SNPN is 999.

During network sharing, a cell of a base station may belong to different operators, that is, may provide services for users of different operators. According to an existing protocol, one cell may be shared by the foregoing three types of networks. In other words, a plurality of networks of different types may exist in a same cell. For example, one cell may have the following seven networks:

a network #1: PLMN #1;
a network #2: PLMN #1 and CAG #1;
a network #3: PLMN #1 and CAG #2;
a network #4: PLMN #2 and CAG #1;
a network #5: PLMN #1 and NID #1;
a network #6: PLMN #2 and NID #1; and
a network #7: PLMN #3 (MCC=999) and NID #1.

For the foregoing seven different networks, the network #1 is a public network, the network #2, the network #3, and the network #4 are non-stand-alone non-public networks, and the network #5, the network #6, and the network #7 are stand-alone non-public networks.

Further, the network #2, the network #3, and the network #5 are non-public networks deployed (or built) in the public network whose identity is PLMN #1, that is, are non-public networks relying on the public network PLMN #1. In other words, the network #2, the network #3, and the network #5 use network resources of the public network PLMN #1.

The network #4 and the network #6 are non-public networks deployed in a public network whose identity is PLMN #2, that is, are non-public networks relying on the public network PLMN #2. In other words, the network #4 and the network #6 use network resources of the public network PLMN #2.

The MCC of the network #7 is 999, and this indicates that the network #7 does not use network resources of a public network. In other words, the network #7 does not rely on the public network. For example, the network #7 may be a non-public network deployed by an enterprise or the like.

TABLE 1

| Network | Index | Network identity | |
|---|---|---|---|
| | | PLMN ID | CAG ID/NID |
| Network #1 | 1 | PLMN #1 | |
| Network #2 | 2 | PLMN #1 | CAG #1 |
| Network #3 | 3 | PLMN #1 | CAG #2 |
| Network #4 | 4 | PLMN #2 | CAG #1 |
| Network #5 | 5 | PLMN #1 | NID #1 |
| Network #6 | 6 | PLMN #2 | NID #1 |
| Network #7 | 7 | PLMN #3 (MCC = 999) | NID #1 |

In a network sharing scenario, a terminal device may learn of a network sharing status of a cell by reading a system broadcast of the cell. For example, the terminal device in the cell may read a SIB1, and the SIB1 includes an identity of a public network and an identity of a non-public network in the cell. Optionally, the SIB1 may further include information such as an index of the public network and an index of the non-public network in the cell. It may be understood that the terminal device may alternatively determine the indices of the public network and the non-public network based on positions of the identity of the public network and the identity of the non-public network in a network identity list. In an example, Table 1 shows a network list that is of the cell and that is determined by the terminal device based on the network identity list in the SIB1 broadcast by the cell, and the network list includes the foregoing seven networks.

For a cell in which network sharing exists, after a terminal device in an idle mode accesses a CAG network (for example, the network #2) in the cell, the terminal device needs to report an identity of the CAG network to a base station through an RRC setup complete message, so that the base station can learn of a connection status between the CAG network and the terminal device (for example, learn of a quantity of accessed terminal devices). The base station may determine, based on the connection status, whether to allow a new terminal device to access the CAG network, and may properly allocate a resource to a terminal device in the CAG network based on the connection status.

However, the RRC setup complete message is not encrypted. Consequently, the identity of the CAG network that is reported by the terminal device is likely to be intercepted by a criminal. The criminal may determine an identity of a user (for example, determine that the user is an employee of a company) based on the intercepted identity of the CAG network, and then perform illegal activities such as monitoring and tracking more purposefully. This results in a great security risk, and does not comply with a privacy requirement of a non-public network.

Based on the foregoing problem, this application provides a communication method and a communications apparatus, to securely and reliably indicate, to a base station, a non-public network accessed by a terminal device.

It may be understood that in embodiments of this application, a terminal device and/or a network device (for example, an access network device and/or a core network device) may perform some or all steps in embodiments of this application. These steps or operations are merely examples. In embodiments of this application, other operations or variations of various operations may alternatively be performed. In addition, the steps may be performed in a sequence different from a sequence presented in embodiments of this application, and not all operations in embodiments of this application may be performed.

The following describes a communication method in embodiments of this application with reference to the accompanying drawings. An access network device in the embodiments may be the access network device 101 in FIG. 1, a terminal device in the embodiments may be the terminal device 102 in FIG. 1, and a core network device in the embodiments may be the core network device 103 in FIG. 1.

Figure 5:
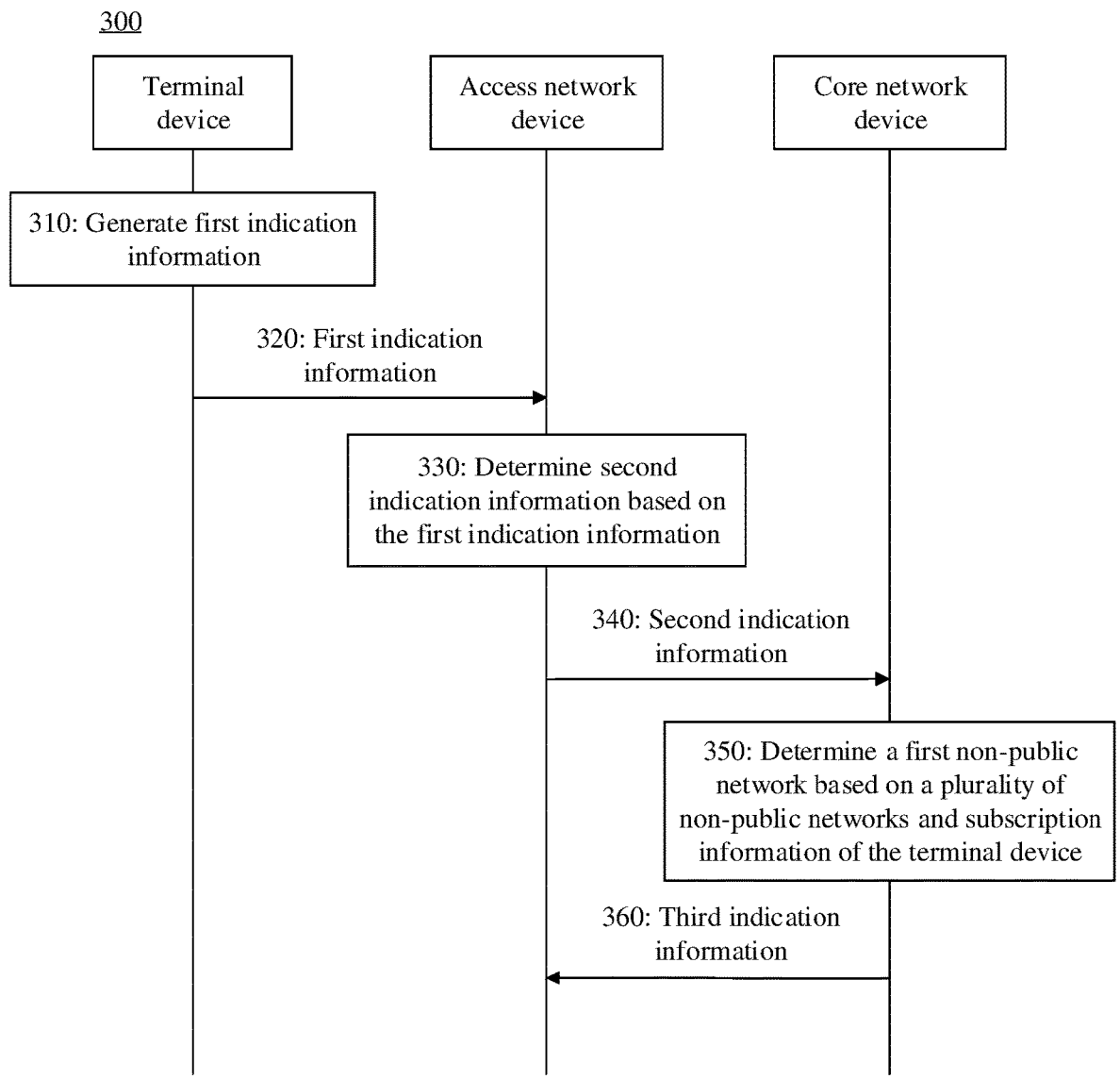
FIG. 5 is a schematic flowchart of an example of a communication method according to an embodiment of this application.

FIG. 5 is a schematic flowchart of a communication method 300 according to this application. The communication method 300 provided in an embodiment of this application is described below with reference to FIG. 5. The method 300 includes the following steps.

Step 310: A terminal device generates first indication information, where the first indication information is used to indicate a plurality of non-public networks, the plurality of non-public networks include a first non-public network, and the first non-public network is a network that the terminal device requests to access.

Step 320: The terminal device sends the first indication information to an access network device.

Correspondingly, in step 320, the access network device receives the first indication information sent by the terminal device.

Step 330: The access network device determines second indication information based on the first indication information, where the second indication information indicates the plurality of non-public networks.

Specifically, the method 300 provided in this embodiment of this application may be applied to a network sharing scenario. The access network device may simultaneously have a plurality of non-public networks in one cell (denoted as a cell #A), and types of the plurality of non-public networks may include at least one of a stand-alone non-public network and a non-stand-alone non-public network. Optionally, the cell #A may further include at least one public network.

To describe the technical solutions of this application more conveniently and efficiently, by way of example instead of limitation, the cell #A may include nine networks listed in Table 2. Table 2 is a list of networks included in the cell #A in a network sharing scenario.

It can be learned from Table 2 that the cell #A is shared by the nine networks, including two public networks, four non-stand-alone non-public networks, and three stand-alone non-public networks. The terminal device can determine an index corresponding to each network based on a position of a network identity of the network in a network identity list.

It can be learned based on a network identity of each non-public network in Table 2 that non-stand-alone non-public networks #1, #2, and #3 all rely on a network PLMN #1, a non-stand-alone non-public network #4 relies on a network PLMN #2, a stand-alone non-public network #1 relies on the network PLMN #1, and stand-alone non-public networks #2 and #3 rely on the network PLMN #2.

TABLE 2

| Network | Network identity | | Network index determined by UE |
|---|---|---|---|
| | PLMN ID | CAG ID/NID | |
| Public network #1 | PLMN #1 | | 1 |
| Public network #2 | PLMN #2 | | 2 |
| Non-stand-alone non-public network #1 | PLMN #1 | CAG #1 | 3 |
| Non-stand-alone non-public network #2 | PLMN #1 | CAG #2 | 4 |
| Non-stand-alone non-public network #3 | PLMN #1 | CAG #3 | 5 |
| Non-stand-alone non-public network #4 | PLMN #2 | CAG #1 | 6 |
| Stand-alone non-public network #1 | PLMN #1 | NID #1 | 7 |
| Stand-alone non-public network #2 | PLMN #2 | NID #1 | 8 |
| Stand-alone non-public network #3 | PLMN #2 | NID #2 | 9 |

The terminal device camps on the cell #A and is a user in the cell #A. When the terminal device requests to access a non-public network (for example, the first non-public network), the terminal device needs to perform indication to the access network device.

The first non-public network is one of a plurality of non-public networks deployed by the access network device in the cell #A. For example, the first non-public network may be any one of the seven non-public networks in Table 2. When requesting to access the first non-public network, the terminal device may generate the first indication information and perform indication to the access network device. Herein, requesting to access the first non-public network may be understood as requesting to set up an RRC connection to the first non-public network.

In this embodiment of this application, the first indication information is used to indicate the plurality of non-public networks including the first non-public network, and which one of the plurality of non-public networks is the first non-public network cannot be determined by using only content of the first indication information. In this way, even if the first indication information is intercepted by a criminal, the specific network that the terminal device requests to access cannot be determined, so that an identity of a user is not exposed, and use security of the network is improved.

For example, the first non-public network may be the non-stand-alone non-public network #1 in Table 2, and the first indication information may be used to indicate the non-stand-alone non-public networks #1, #2, and #3 in Table 2. In this way, even if the first indication information is intercepted by the criminal, which one of the non-stand-alone non-public networks #1, #2, and #3 is specifically the network that the terminal device requests to access cannot be determined. This protects user privacy and improves security.

In addition to the first non-public network, the plurality of non-public networks further include at least one other non-public network. Types, a quantity, and the like of the plurality of non-public networks are not limited in this application.

Optionally, all the plurality of non-public networks may be non-stand-alone non-public networks.

Optionally, all the plurality of non-public networks may be stand-alone non-public networks.

Optionally, the plurality of non-public networks may include both a non-stand-alone non-public network and a stand-alone non-public network.

Optionally, the plurality of non-public networks may rely on a same public network.

Optionally, the plurality of non-public networks may rely on different public networks.

In step 310, the terminal device generates the first indication information.

How the terminal device generates the first indication information is not limited in this application. For example, the terminal device may generate the first indication information in at least one of the following manners.

Manner 1: The terminal device generates the first indication information based on the plurality of non-public networks.

Before the terminal device generates the first indication information, the terminal device may first determine the plurality of non-public networks, and generate the first indication information based on the plurality of non-public networks.

Specifically, in addition to the first non-public network, the plurality of non-public networks further include at least one other non-public network. Therefore, the terminal device may first determine another non-public network in the plurality of non-public networks. The terminal device may randomly determine the another non-public network. This is not limited in this application.

Optionally, a non-public network other than the first non-public network in the cell #A may be determined as the another non-public network. For example, when the first non-public network is the non-stand-alone non-public network #1, the terminal device may determine one or more of the non-stand-alone non-public networks #2, #3, and #4 and the stand-alone non-public networks #1, #2, and #3 as the another non-public network.

Optionally, in non-public networks other than the first non-public network in the cell #A, a non-public network having a same type as the first non-public network may be determined as the another non-public network. For example, when the first non-public network is the non-stand-alone non-public network #1, the terminal device may determine one or more of the non-stand-alone non-public networks #2, #3, and #4 as the another non-public network.

Optionally, in non-public networks other than the first non-public network in the cell #A, a non-public network relying on a same network as the first non-public network may be determined as the another non-public network. For example, when the first non-public network is the non-stand-alone non-public network #1, the first non-public network relies on the network PLMN #1. In this case, the terminal device may determine, as the another non-public network, one or more of the non-stand-alone non-public networks #2 and #3 and the stand-alone non-public network #1 that rely on the PLMN #1.

Optionally, in non-public networks other than the first non-public network in the cell #A, a non-public network having a same type as the first non-public network and relying on a same network as the first non-public network may be determined as the another non-public network. For example, when the first non-public network is the non-stand-alone non-public network #1, the first non-public network relies on the network PLMN #1. In this case, the terminal device may determine, as the another non-public network, one or more of the non-stand-alone non-public networks #2 and #3 that rely on the PLMN #1.

By way of example instead of limitation, the terminal device may receive a broadcast message in the cell #A, and determine the another non-public network other than the first non-public network in the plurality of non-public networks based on a system information block (for example, a SIB1) in the broadcast message.

Specifically, the system information block in the broadcast message includes related information of each network included in the cell #A (for example, information in Table 2). The terminal device may obtain related information of the another non-public network in the cell #A based on the system information block, and then determine the another non-public network.

In Manner 1, the terminal device first determines the plurality of non-public networks, and then determines the first indication information based on the plurality of non-public networks. On this basis, the terminal device may directly indicate the plurality of non-public networks.

Optionally, the first indication information may include indication information of each of the plurality of non-public networks.

Optionally, the indication information of each non-public network includes an identity of the non-public network.

For example, the first non-public network may be the non-stand-alone non-public network #1, and the other non-public networks are the non-stand-alone non-public networks #2 and #3. In this case, the first indication information may include identities of the three non-public networks, that is, PLMN #1 and CAG #1, PLMN #1 and CAG #2, and PLMN #1 and CAG #3. The access network device can determine, based on the identities of the three non-public networks, that the three non-public networks indicated by the first indication information are the non-stand-alone non-public networks #1, #2, and #3.

In addition, on a premise that the plurality of non-public networks rely on a same network (that is, PLMN IDs in non-public network identities are the same), an identity of only one network may be reported. This helps reduce an amount of data that needs to be transmitted, and further helps reduce signaling overheads.

Optionally, the indication information of each non-public network may include an index of the non-public network. After receiving the first indication information, the access network device can determine the plurality of non-public networks based on indices in the first indication information.

For example, the first non-public network may be the non-stand-alone non-public network #1, and the other non-public networks are the non-stand-alone non-public networks #2 and #3. In this case, the first indication information may include indices of the three non-public networks, that is, 3, 4, and 5. The access network device may determine, in a corresponding network list based on the indices, that the three non-public networks indicated by the first indication information are the non-stand-alone non-public networks #1, #2, and #3.

In addition, hybrid reporting may be alternatively used. To be specific, some of the plurality of non-public networks are indicated by using non-public network identities, and remaining non-public networks are indicated by using non-public network indices. This is not limited in this application.

In step 320, the terminal device sends the first indication information to the access network device.

Optionally, the first indication information is carried in an RRC setup complete message.

Optionally, the first indication information may alternatively be carried in other signaling, or may be separately sent. This is not limited in this application.

For Manner 1, in step 330, that the access network device determines the second indication information based on the first indication information may be: After receiving the first indication information, the access network device reads content in the first indication information, determines which non-public networks are specifically the plurality of non-public networks, and then generates the second indication information. The second indication information includes the indication information of each of the plurality of non-public networks.

Optionally, the second indication information may include the indication information of each of the plurality of non-public networks.

Optionally, the indication information of each non-public network includes an identity or an index of the non-public network.

Optionally, content of the second indication information may be the same as content of the first indication information. In this case, the access network device may play a "forwarding" role.

Optionally, content of the second indication information may alternatively be different from that of the first indication information.

Optionally, the first indication information and the second indication information may be transmitted by using a non-access stratum (NAS). To be specific, the terminal device transparently transmits indication information of the plurality of non-public networks to a core network device through the access network device. In this case, the access network device does not perceive content of the indication information.

For example, the first indication information includes indices of the plurality of non-public networks, but the second indication information may include identities of the plurality of non-public networks. This is not limited in this application.

Manner 2: The terminal device generates the first indication information based on the first non-public network.

Specifically, the terminal device determines a type of the first non-public network, and determines non-public network access indication information based on the type of the first non-public network. The non-public network access indication information is used to indicate that the network (namely, the first non-public network) that the terminal device requests to access is a non-public network. Optionally, the non-public network access indication information may be further used to indicate a type of the non-public network that the terminal device requests to access. Further, the terminal device determines that a network on which the first non-public network relies is a first network, and determines indication information of the first network based on the first network. The indication information of the first network is used to determine the first network, or determine the first network and a type of a non-public network in the first network.

The first indication information includes the non-public network access indication information and the indication information of the first network. Optionally, the plurality of non-public networks are non-public networks relying on the first network.

After receiving the first indication information, the access network device can determine, based on the non-public network access indication information, that the network that the terminal device requests to access is a non-public network, and determine, based on the indication information of the first network, the first network on which the non-public network relies. Further, the access network device may determine non-public networks in the first network or non-public networks of a same type in the first network as the plurality of non-public networks. In other words, the first indication information may indirectly indicate the plurality of non-public networks.

Optionally, a type of the first non-public network is a non-stand-alone non-public network, and the non-public network access indication information is used to indicate that the network that the terminal device requests to access is a non-stand-alone non-public network. After receiving the first indication information, the access network device determines all non-stand-alone non-public networks relying on the first network in the cell #A as the plurality of non-public networks.

Optionally, a type of the first non-public network is a stand-alone non-public network, and the non-public network access indication information is used to indicate that the network that the terminal device requests to access is a stand-alone non-public network. After receiving the first indication information, the access network device determines all stand-alone non-public networks relying on the first network in the cell #A as the plurality of non-public networks.

Optionally, the non-public network access indication information is used to indicate that the network that the terminal device requests to access is a non-public network (that is, the network is indicated as only a non-public network but is not specifically indicated as a non-standalone non-public network or a stand-alone non-public network), and the indication information of the first network is used to determine the first network. After receiving the first indication information, the access network device determines all non-public networks relying on the first network in the cell #A as the plurality of non-public networks.

Optionally, the non-public network access indication information is used to indicate that the network that the terminal device requests to access is a non-public network (that is, the network is indicated as only a non-public network but is not specifically indicated as a non-stand-alone non-public network or a stand-alone non-public network), and the indication information of the first network is used to determine the first network that the terminal device requests to access and a type of a non-public network in the first network. The access network device receives the first indication information and the indication information of the first network, and determines corresponding non-public networks relying on the first network in the cell #A as the plurality of non-public networks.

Optionally, according to a stipulation in a protocol or a system, the non-public network access indication information may be a string of specific code, or may be 1-bit "0" or "1".

For example, 1-bit "1" may be used to indicate that the network that the terminal device requests to access is a non-stand-alone non-public network. Optionally, 1-bit "0" may be used to indicate that the network that the terminal device requests to access is a stand-alone non-public network. After receiving the non-public network access indication information, the access network device determines, based on a value of a corresponding bit, whether the network (that is, the first non-public network) that the terminal device requests to access is a non-stand-alone non-public network or a stand-alone non-public network.

In addition, the non-public network access indication information may alternatively be an implicit indication. This is not limited in this application.

Optionally, whether the network (that is, the first non-public network) that the terminal device requests to access is a non-public network may alternatively be indicated based on whether the first indication information includes the non-public network access indication information.

The first network is a network on which the first non-public network relies. For example, the first network may be a public network.

Optionally, the indication information of the first network may include an identity or an index of the first network. Alternatively, the indication information of the first network may include an identity of the first network and any non-public network identity in the identity of the first network, or corresponding indices. Alternatively, the indication information of the first network may include an identity of the first network and an identity of a non-public network having a same type as the first non-public network, or corresponding indices.

Optionally, the indication information of the first network may include an identity of any non-public network other than the first non-public network in the first network in the cell #A. According to a stipulation in a system or a protocol, after receiving the indication information of the first network, the access network device determines the first network based on a PLMN ID in the indication information of the first network, and automatically ignores a subsequent CAG ID or NID. An advantage of the foregoing setting is that a criminal may be confused, and an incorrect non-public network identity is presented to the criminal, to palm off falsehood as truth.

In a specific example, the first non-public network may be the non-stand-alone non-public network #1, the identity of the first network on which the first non-public network relies is PLMN #1, and the indication information of the first network may include a non-public network identity PLMN #1 and CAG #2 of the non-stand-alone non-public network #2 or a corresponding index 4. After receiving the indication information of the first network, the access network device determines that the first network is a network whose identity is PLMN #1, and automatically ignores the subsequent CAG #2. Optionally, the access network device may further determine that a non-public network type is CAG.

It should be understood that in embodiments of this application, the "protocol" may be a standard protocol in the communications field, for example, may include an LTE protocol, an NR protocol, and a related protocol applied to a future communications system. This is not limited in this application.

For Manner 2, in step 330, that the access network device determines the second indication information based on the first indication information may be: After receiving the first indication information, the access network device reads content in the first indication information, determines which non-public networks are specifically the plurality of non-public networks, and then generates the second indication information. The second indication information includes the indication information of each of the plurality of non-public networks.

For a related process in which the access network device determines the plurality of non-public networks based on the first indication information, refer to the foregoing descriptions. Details are not described herein again.

Optionally, the second indication information may include the indication information of each of the plurality of non-public networks.

Optionally, the indication information of each non-public network includes an identity or an index of the non-public network.

The following describes Manner 2 based on a specific example.

In an example, when the first non-public network is the non-stand-alone non-public network #1, an identity of the non-stand-alone non-public network #1 is PLMN #1 and CAG #1. The terminal device determines, based on the first non-public network, that the non-public network access indication information is used to indicate that the network that the terminal device requests to access is a non-stand-alone non-public network. The terminal device may further determine that the indication information of the first network may include the identity PLMN #1 of the first network or include at least one of indices 3, 4, and 5. After receiving the first indication information, the access network device determines the second indication information. The second indication information may include identities of all non-stand-alone non-public networks in the network whose identity is PLMN #1. In other words, the PLMN #1 and the non-stand-alone non-public networks #1, #2, and #3 may be retained in the second indication information.

In another example, the first non-public network may be the non-stand-alone non-public network #4, and its identity is PLMN #2 and CAG #1. In this case, the terminal device learns, by reading the network list of the cell #A, that there is only one non-stand-alone non-public network in the network whose identity is PLMN #2 and there are further two stand-alone non-public networks. Therefore, the terminal device may determine, based on the first non-public network, that the non-public network access indication information is used to indicate that the network that the terminal device requests to access is a non-public network (that is, the network is indicated as only a non-public network but is not specifically indicated as a non-stand-alone non-public network or a stand-alone non-public network), and the indication information of the first network may include an identity: PLMN #2 and NID #1 of the stand-alone non-public network #2. The plurality of non-public networks are all non-public networks relying on the network whose identity is PLMN #2, that is, the non-stand-alone non-public network #4 and the stand-alone non-public networks #2 and #3. After receiving the first indication information, the access network device determines that the plurality of non-public networks are all non-public networks in the network whose identity is PLMN #2, that is, the non-stand-alone non-public network #4 and the stand-alone non-public networks #2 and #3.

In step 340, the access network device sends the second indication information to a core network device.

Correspondingly, in step 340, the core network device receives the second indication information sent by the access network device.

In step 350, the core network device determines the first non-public network based on the plurality of non-public networks and subscription (subscription) information of the terminal device.

Optionally, in step 360, the core network device sends third indication information to the access network device, where the third indication information indicates the first non-public network.

Correspondingly, in step 360, the access network device receives the third indication information sent by the core network device.

Specifically, it can be learned with reference to the foregoing descriptions that the access network device may determine the plurality of non-public networks based on the first indication information, but the access network device cannot determine which one of the plurality of non-public networks is the first non-public network, that is, cannot determine a specific network that the terminal device requests to access. In this case, the terminal device may send the second indication information to the core network device, the second indication information indicates the plurality of non-public networks, and which one of the plurality of non-public networks is the first non-public network may be determined with the help of the core network device.

Optionally, the second indication information may be carried in an initial terminal device message (initial UE message).

Optionally, the second indication information may alternatively be carried in other RRC signaling, or may be separately sent. This is not limited in this application.

In step 350, the core network device determines the first non-public network based on the plurality of non-public networks indicated by the second indication information and the subscription information of the terminal device.

Specifically, the core network device may obtain the subscription information of the terminal device, and the core network device can determine, based on the subscription information, specific networks in which the terminal device has been authenticated in the cell #A, or specific networks that the terminal device can access in the cell #A. The network herein includes a public network, a non-stand-alone non-public network, a stand-alone non-public network, or the like.

Generally, for the cell #A having a plurality of non-public networks, the terminal device is usually authenticated in only one of the non-public networks, or in other words, the terminal device can usually access only one non-public network in the cell #A.

Therefore, in step 350, after obtaining the subscription information of the terminal device, the core network device determines, based on the subscription information, a specific non-public network that is in the plurality of non-public networks indicated by the second indication information and in which the terminal device is authenticated. The core network device may determine that the non-public network in which the terminal device is authenticated is the first non-public network, and indicate the non-public network to the access network device. The following describes the foregoing first non-public network determining process based on a specific example.

In an example, the first non-public network may be the non-stand-alone non-public network #1, and the plurality of non-public networks may be the non-stand-alone non-public networks #1, #2, and #3. It can be determined, based on the subscription information of the terminal device, that the terminal device is authenticated in only the non-stand-alone non-public network #1 in the three non-public networks. In this case, the core network device may determine the non-stand-alone non-public network #1 as the first non-public network, and indicate the non-stand-alone non-public network #1 to the access network device.

The following describes, by using an example, how the core network device obtains the subscription information of the terminal device.

The core network device receives the second indication information sent by the access network device. The second indication information includes an identifier of the terminal device. For example, the identifier may be a 5G S-temporary mobile subscriber identity (5G-S-TMSI). The terminal device determines an identity of the terminal device based on the identifier, and identifies an international mobile subscriber identity (ISMI) of the terminal device. The core network device may obtain the subscription information of the terminal device from a home subscriber server (HSS) based on the ISMI.

Optionally, the core network device may be an access and mobility management function AMF entity. Alternatively, the core network device may be any other entity or network element that can implement a corresponding function. This is not limited in this application.

In step 360, the core network device sends the third indication information to the access network device, where the third indication information indicates the first non-public network.

After receiving the third indication information, the access network device determines, as the non-public network that the terminal device requests to access, the non-public network indicated by the third indication information. In other words, the access network device determines that the network that the terminal device requests to access is the first non-public network. The access network device may further determine a connection status between the first non-public network and the terminal device (for example, determine a quantity of accessed terminal devices). The access network device may determine, based on the connection status, whether to allow a new terminal device to access the first non-public network, and may properly allocate a resource to a terminal device in the first non-public network based on the connection status.

In step 360, the core network device sends the third indication information to the access network device, where the third indication information indicates the first non-public network. Because data transmission between the core network device and the access network device is more secure and reliable (for example, transmission may be performed in a wired manner), a criminal cannot learn of the specific network that the terminal device really needs to access. Therefore, user privacy is protected, and use security of the network is improved.

Optionally, the third indication information is carried in an initial context setup request message.

Optionally, the third indication information may alternatively be carried in other RRC signaling, or may be separately sent. This is not limited in this application.

Optionally, the third indication information includes an identity or an index of the first non-public network.

In rare cases, for the cell #A having the plurality of non-public networks, the terminal device may be authenticated in two or more of the non-public networks. The core network device may incorrectly consider a non-public network (denoted as a second non-public network) other than the first non-public network as the network that the terminal device requests to access, and indicate the non-public network to the access network device. In this case, the access network device also incorrectly determines the second non-public network as the non-public network that the terminal device requests to access. For this case, after the terminal device enters a connected mode and performs encrypted data transmission, the terminal device may communicate with the access network device by using a message such as a terminal device configuration, and the terminal device may notify the access network device and the core network device of indication information of the first non-public network. Alternatively, the terminal device may leave the first non-public network and set up a connection to the second non-public network.

Figure 6:
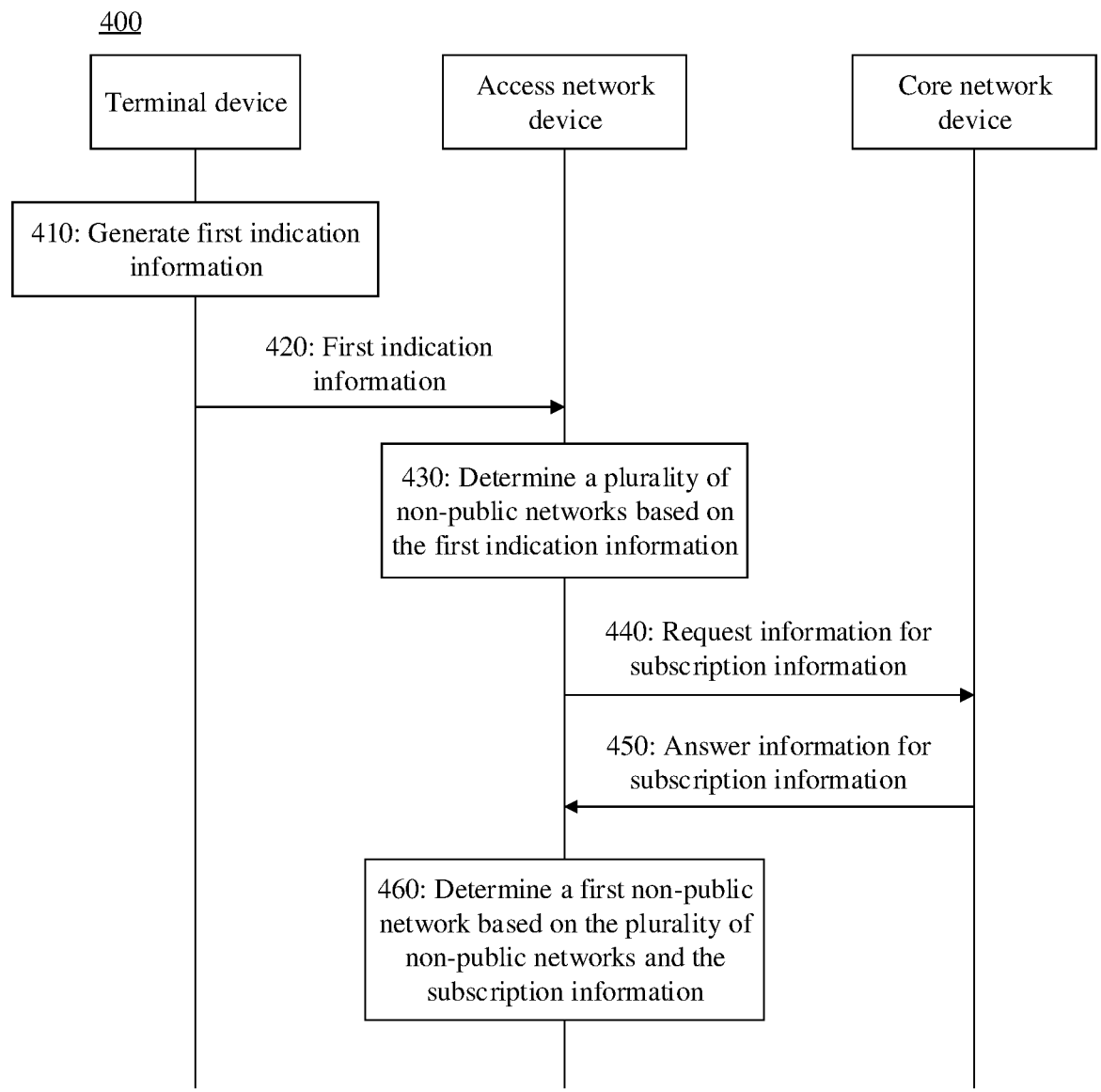
FIG. 6 is a schematic flowchart of another example of a communication method according to an embodiment of this application.

FIG. 6 is a schematic flowchart of a communication method 400 according to this application. An embodiment shown in FIG. 6 may be considered as a variant of the embodiment shown in FIG. 5. The communication method 400 provided in this embodiment of this application is described below with reference to FIG. 6. The method 400 includes the following steps.

Step 410: A terminal device generates first indication information, where the first indication information is used to indicate a plurality of non-public networks, the plurality of non-public networks include a first non-public network, and the first non-public network is a network that the terminal device requests to access.

Step 420: The terminal device sends the first indication information to an access network device.

Correspondingly, in step 420, the access network device receives the first indication information sent by the terminal device.

Step 430: The access network device determines the plurality of non-public networks based on the first indication information.

Step 440: The access network device sends request information for subscription information of the terminal device to a core network device.

Correspondingly, in step 440, the core network device receives the request information that is for the subscription information and that is sent by the access network device.

Step 450: The core network device sends answer information for the subscription information of the terminal device to the access network device.

Correspondingly, in step 450, the access network device receives the answer information that is for the subscription information of the terminal device and that is sent by the core network device.

In step 460, the access network device determines, based on the plurality of non-public networks and the subscription information of the terminal device, that the first non-public network is the network that the terminal device requests to access.

The foregoing steps 410, 420, and 430 may be understood with reference to steps 310, 320, and 330 in the method 300, and differences are described herein.

In this embodiment of this application, the differences from the embodiment shown in FIG. 5 are mainly as follows: In the foregoing embodiment, the core network device determines the first non-public network, and then sends the first non-public network to the access network device. However, in this embodiment, the access network device determines the first non-public network. In the foregoing embodiment, the core network device can perceive the first non-public network. However, in this embodiment, the core network device cannot perceive the first non-public network.

Specifically, in this embodiment of this application, the access network device sends the request information for the subscription information of the terminal device to the core network device, to request the subscription information of the terminal device. After receiving the request information, the core network device sends the subscription information to the access network device. The access network device autonomously determines the first non-public network.

Optionally, the request information for the subscription information of the terminal device may be carried in an initial terminal device message.

Optionally, the answer information for the subscription information of the terminal device may be carried in an initial context setup request message.

Optionally, there is no logical sequence between step 430 and a combination of step 440 and step 450. Therefore, a sequence between step 430 and the combination of step 440 and step 450 is not limited in this embodiment of this application.

For example, step 430 may be performed before step 440.

For another example, step 430 may be performed between step 440 and step 450.

For another example, step 430 may be performed after step 450.

For another example, step 430 may be performed together with step 440 or step 450.

In step 460, the access network device determines, based on the plurality of non-public networks and the subscription information of the terminal device, that the first non-public network is the non-public network that the terminal device requests to access. Step 460 may be understood with reference to step 350 and step 360 in the method 300, and details are not described herein again.

The foregoing describes in detail the communication methods in embodiments of this application with reference to FIG. 1 to FIG. 6. The following describes in detail apparatuses in embodiments of this application with reference to FIG. 7 to FIG. 12. It should be understood that the apparatuses shown in FIG. 7 to FIG. 12 can implement one or more steps in the method procedure shown in FIG. 5 or FIG. 6. To avoid repetition, details are not described herein again.

Figure 7:
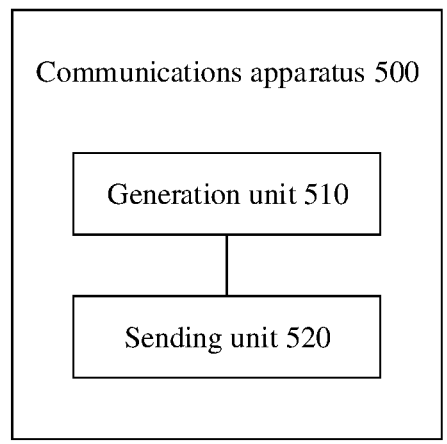
FIG. 7 is a schematic block diagram of an example of a communications apparatus according to an embodiment of this application.

FIG. 7 is a schematic block diagram of a communications apparatus 500 according to an embodiment of this application. As shown in FIG. 7, the apparatus 500 includes a generation unit 510 and a sending unit 520.

The generation unit 510 is configured to generate first indication information, where the first indication information is used to indicate a plurality of non-public networks, the plurality of non-public networks include a first non-public network, and the first non-public network is a network that the communications apparatus requests to access.

The sending unit 520 is configured to send the first indication information to an access network device.

Optionally, the first indication information includes indication information of each of the plurality of non-public networks.

Optionally, the indication information of each non-public network includes an identity of the non-public network or an index of the non-public network.

Optionally, the first indication information specifically includes non-public network access indication information and indication information of a first network, the non-public network access indication information is used to indicate that the network that the communications apparatus requests to access is a non-public network, the first network is a network on which the first non-public network relies, and the plurality of non-public networks are non-public networks relying on the first network.

Specifically, the communications apparatus 500 may correspond to the terminal device in the communication method 300 or 400 according to embodiments of this application, or a chip disposed in the terminal device. The communications apparatus 500 may include units configured to perform the method performed by the terminal device in the communication method 300 in FIG. 5 or the communication method 400 in FIG. 6. In addition, the units in the communications apparatus 500 and the foregoing other operations and/or functions are separately used to implement corresponding procedures of the communication method 300 in FIG. 5 or the communication method 400 in FIG. 6. Specific processes of performing the foregoing corresponding steps by the units are described in detail in the method 300 and the method 400. For brevity, details are not described herein again.

The communications apparatus 500 may be an intelligent terminal, a wearable device, or the like, and the sending unit 520 may be a transceiver or a transceiver circuit. Optionally, the transceiver may alternatively be an input/output circuit or an interface.

The communications apparatus 500 may alternatively be a chip. The sending unit 520 may be an input/output circuit or an interface of the chip.

In a possible implementation, the communications apparatus 500 may be a terminal device 50. A function of the generation unit 510 may be implemented by a processor 502 in the terminal device 50, and a function of the sending unit 520 may be implemented by a transceiver 501 (that is, a combination of a control circuit and an antenna) in the terminal device. The following describes a structure of a terminal device in an embodiment of this application with reference to FIG. 8.

Figure 8:
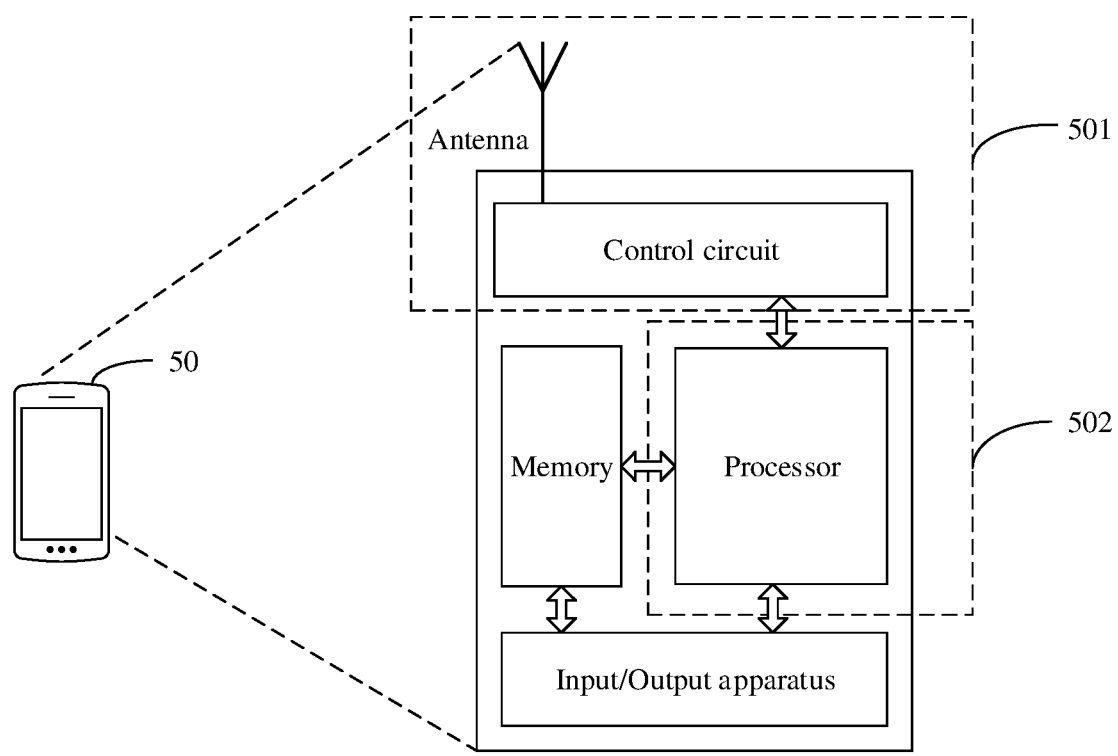
FIG. 8 is a schematic diagram of a structure of a terminal device according to an embodiment of this application.

FIG. 8 is a schematic diagram of a structure of a terminal device according to an embodiment of this application. The terminal device is applicable to the system shown in FIG. 1, and performs a function of the terminal device in the foregoing method embodiments. For ease of description, FIG. 8 shows only main components of the terminal device. As shown in FIG. 8, the terminal device 50 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing actions described in the foregoing method embodiments. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver, mainly configured to send/receive a radio frequency signal in a form of an electromagnetic wave. The input/output apparatus such as a touchscreen, a display, or a keyboard is mainly configured to: receive data entered by a user, and output data to the user.

After the terminal device is powered on, the processor may read the software program in the memory, explain and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 8. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment of this application, the control circuit and the antenna having sending and receiving functions may be considered as a transceiver unit 501 of the terminal device 50. For example, the transceiver unit 501 is configured to support the terminal device in performing the receiving function and the sending function. A processor 502 having a processing function is considered as a processing unit 502 of the terminal device 50. As shown in FIG. 8, the terminal device 50 includes the transceiver unit 501 and the processing unit 502. The transceiver unit may also be referred to as a transceiver machine, a transceiver, a transceiver apparatus, or the like. Optionally, a component configured to implement the receiving function in the transceiver unit 501 may be considered as a receiving unit, and a component configured to implement the sending function in the transceiver unit 501 may be considered as a sending unit. In other words, the transceiver unit 501 includes the receiving unit and the sending unit. The receiving unit may also be referred to as a receiver, an input port, a receiving circuit, or the like. The sending unit may be referred to as a transmitter machine, a transmitter, a transmission circuit, or the like.

The processor 502 may be configured to execute instructions stored in the memory to control the transceiver unit 501 to receive a signal and/or send a signal, to complete the functions of the terminal device in the foregoing method embodiments. The processor 502 further includes an interface, configured to implement a signal input/output function. In an implementation, a function of the transceiver unit 501 may be implemented by using a transceiver circuit or a dedicated transceiver chip.

Figure 9:
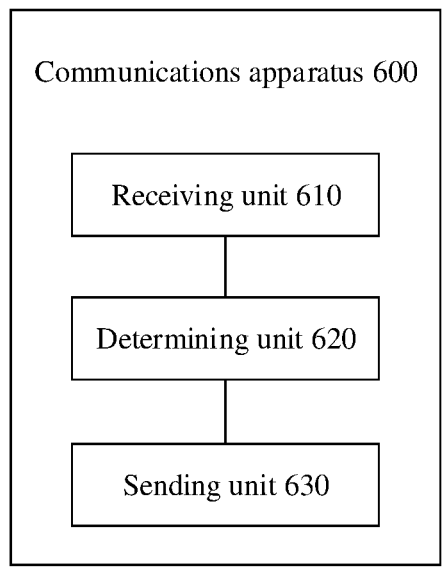
FIG. 9 is a schematic block diagram of another example of a communications apparatus according to an embodiment of this application.

FIG. 9 is a schematic block diagram of a communications apparatus 600 according to an embodiment of this application. As shown in FIG. 9, the apparatus 600 includes a receiving unit 610, a determining unit 620, and a sending unit 630.

The receiving unit 610 is configured to receive first indication information sent by a terminal device, where the first indication information is used to indicate a plurality of non-public networks, the plurality of non-public networks include a first non-public network, and the first non-public network is a network that the terminal device requests to access.

The determining unit 620 is configured to determine second indication information based on the first indication information, where the second indication information indicates the plurality of non-public networks.

The sending unit 630 is configured to send the second indication information to a core network device.

The receiving unit 610 is further configured to receive third indication information sent by the core network device, where the third indication information indicates the first non-public network.

Optionally, the first indication information includes indication information of each of the plurality of non-public networks.

Optionally, the indication information of each non-public network includes an identity of the non-public network or an index of the non-public network.

Optionally, the first indication information specifically includes non-public network access indication information and indication information of a first network, the non-public network access indication information is used to indicate that the network that the terminal device requests to access is a non-public network, the first network is a network on which the first non-public network relies, and the plurality of non-public networks are non-public networks relying on the first network; and the determining unit 620 is further configured to determine the plurality of non-public networks based on the non-public network access indication information and the indication information of the first network.

Optionally, the second indication information includes the indication information of each of the plurality of non-public networks.

Specifically, the communications apparatus 600 may correspond to the access network device in the communication method 300 or 400 according to embodiments of this application, or a chip disposed in the access network device. The communications apparatus 600 may include units configured to perform the method performed by the access network device in the communication method 300 in FIG. 5 or the communication method 400 in FIG. 6. In addition, the units in the communications apparatus 600 and the foregoing other operations and/or functions are separately used to implement corresponding procedures of the communication method 300 in FIG. 5 or the communication method 400 in FIG. 6. Specific processes of performing the foregoing corresponding steps by the units are described in detail in the method 300 and the method 400. For brevity, details are not described herein again.

In a possible implementation, the communications apparatus 600 may be a base station, a gNB, a TRP, a DU, a CU, a CU-CP (control plane), a CU-UP (user plane), or the like. The receiving unit 610 and the sending unit 630 may be a transceiver or a transceiver circuit. Optionally, the transceiver may alternatively be an input/output circuit or an interface.

The communications apparatus 600 may alternatively be a chip. The receiving unit 610 and the sending unit 630 may be an input/output circuit or an interface of the chip.

In a possible implementation, the communications apparatus 600 may be an access network device, for example, the following base station 60. A function of the determining unit 620 may be implemented by using a processor 6022 in the base station, and functions of the receiving unit 610 and the sending unit 630 may be implemented by using an RRU 601 of the base station 60. The following describes a structure of a network device in an embodiment of this application with reference to FIG. 10.

Figure 10:
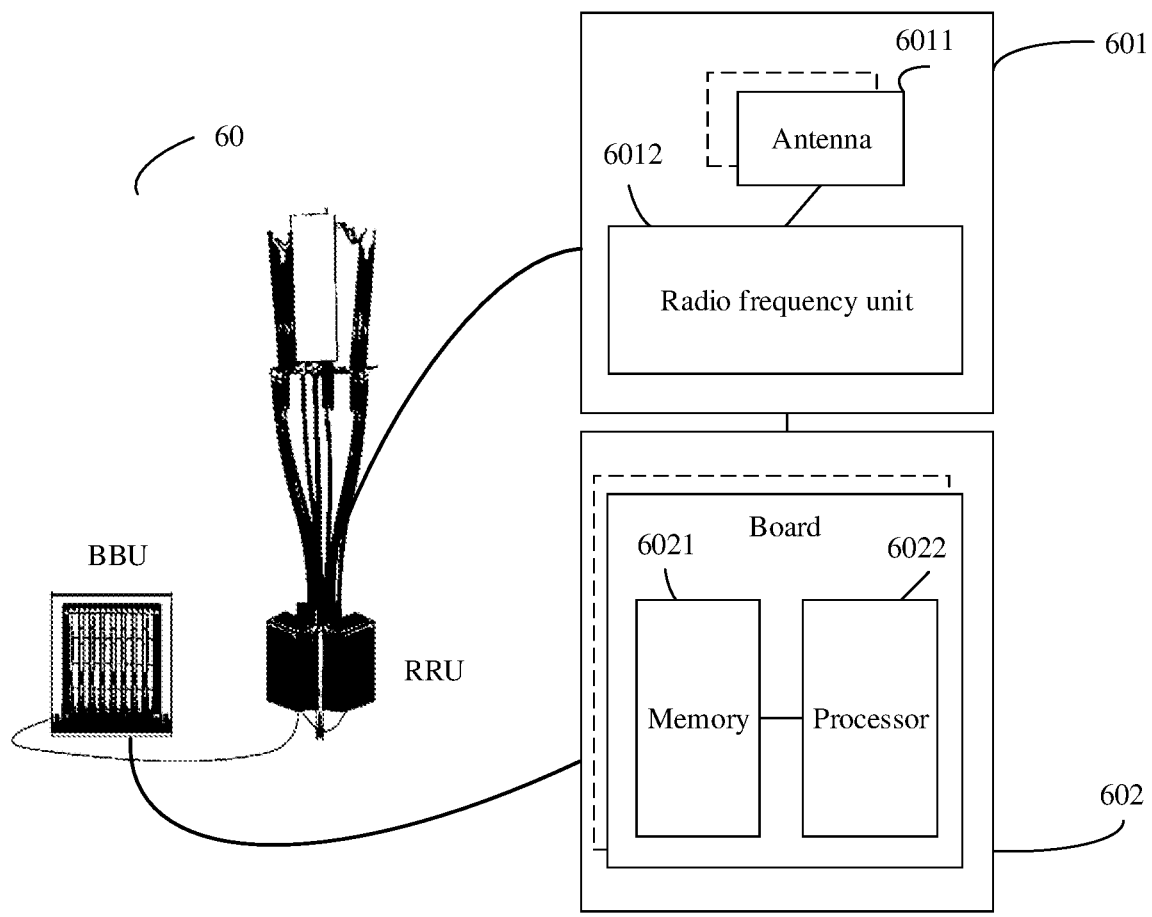
FIG. 10 is a schematic diagram of a structure of an access network device according to an embodiment of this application.

FIG. 10 is a schematic diagram of a structure of an access network device according to an embodiment of this application, for example, may be a schematic diagram of a structure of a base station. As shown in FIG. 10, the base station may be used in the system shown in FIG. 1, to perform functions of the access network device in the foregoing method embodiments. The base station 60 may include one or more radio frequency units, such as a remote radio unit (RRU) 601 and one or more baseband units (BBU) (which may also be referred to as digital units (DU)) 602. The RRU 601 may be referred to as a transceiver unit, a transceiver machine, a transceiver circuit, a transceiver, or the like, and may include at least one antenna 6011 and a radio frequency unit 6012. The RRU 601 is mainly configured to send and receive radio frequency signals, and perform conversion between a radio frequency signal and a baseband signal, for example, configured to send the signaling message in the foregoing embodiments to a terminal device. The BBU 602 is mainly configured to perform baseband processing, control the base station, and the like. The RRU 601 and the BBU 602 may be disposed together physically, or may be separately disposed physically, that is, form a distributed base station.

The BBU 602 is a control center of the base station, may also be referred to as a processing unit, and is mainly configured to implement a baseband processing function, such as channel coding, multiplexing, modulation, or spread spectrum. For example, the BBU (processing unit) 602 may be configured to control the base station to perform the operation procedures of the network device in the foregoing method embodiments.

In an example, the BBU 602 may include one or more boards. A plurality of boards may jointly support a radio access network (such as an LTE network) of a single access standard, or may separately support radio access networks (such as an LTE network, a 5G network, or another network) of different access standards. The BBU 602 further includes a memory 6021 and a processor 6022, and the memory 6021 is configured to store necessary instructions and data. For example, the memory 6021 stores a correspondence between a codebook index and a precoding matrix in the foregoing embodiments. The processor 6022 is configured to control the base station to perform necessary actions, for example, to control the base station to perform the operation procedures of the network device in the foregoing method embodiments. The memory 6021 and the processor 6022 may serve one or more boards. To be specific, a memory and a processor may be disposed on each board. Alternatively, a plurality of boards may share a same memory and processor. In addition, a necessary circuit may be further disposed on each board.

Figure 11:
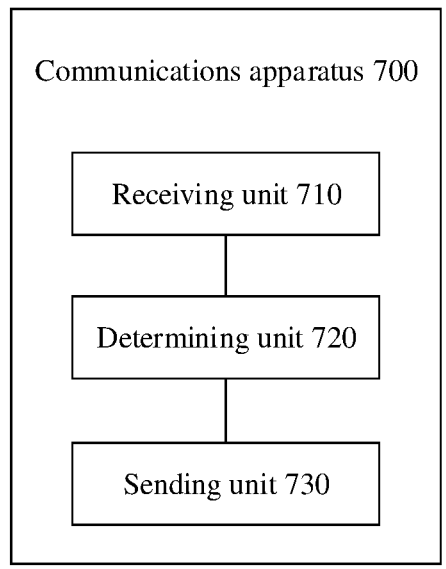
FIG. 11 is a schematic block diagram of still another example of a communications apparatus according to an embodiment of this application.

FIG. 11 is a schematic block diagram of a communications apparatus 700 according to an embodiment of this application. As shown in FIG. 11, the apparatus 700 includes a receiving unit 710, a determining unit 720, and a sending unit 730.

The receiving unit 710 is configured to receive second indication information sent by an access network device, where the second indication information indicates a plurality of non-public networks, the plurality of non-public networks include a first non-public network, and the first non-public network is a network that a terminal device requests to access.

The determining unit 720 is configured to determine the first non-public network based on the plurality of non-public networks and subscription information of the terminal device.

The sending unit 730 is configured to send third indication information to the access network device, where the third indication information indicates the first non-public network.

Optionally, the second indication information includes indication information of each of the plurality of non-public networks.

Optionally, the third indication information includes an identity or an index of the first non-public network.

Specifically, the communications apparatus 700 may correspond to the core network device in the communication method 300 or 400 according to embodiments of this application, or a chip disposed in the core network device. The communications apparatus 700 may include units configured to perform the method performed by the core network device in the communication method 300 in FIG. 5 or the communication method 400 in FIG. 6. In addition, the units in the communications apparatus 700 and the foregoing other operations and/or functions are separately used to implement corresponding procedures of the communication method 300 in FIG. 5 or the communication method 400 in FIG. 6. Specific processes of performing the foregoing corresponding steps by the units are described in detail in the method 300 and the method 400. For brevity, details are not described herein again.

In a possible implementation, the communications apparatus 700 may be a core network device such as an AMF entity, and the receiving unit 710 and the sending unit 730 may be a transceiver or a transceiver circuit. Optionally, the transceiver may alternatively be an input/output circuit or an interface.

The communications apparatus 700 may alternatively be a chip. The receiving unit 710 and the sending unit 730 may be an input/output circuit or an interface of the chip.

In a possible implementation, the communications apparatus 700 may be a core network device, for example, the following core network device 80. A function of the determining unit 820 may be implemented by using a processor 801 in the core network device 80, and functions of the receiving unit 710 and the sending unit 730 may be implemented by using a transceiver 802 of the core network device 80. The following describes a structure of a core network device in an embodiment of this application with reference to FIG. 12.

Figure 12:
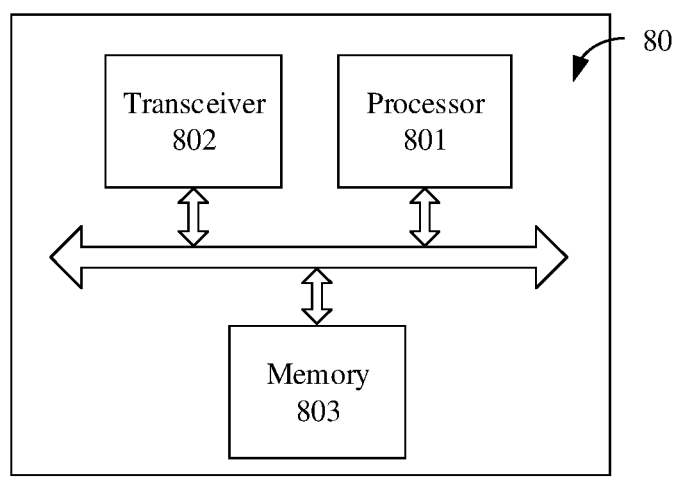
FIG. 12 is a schematic diagram of a structure of a core network device according to an embodiment of this application.

FIG. 12 is a schematic diagram of a structure of a core network device according to an embodiment of this application. As shown in FIG. 12, the core network device 80 includes a processor 801 and a transceiver 802. Optionally, the core network device 80 further includes a memory 803. The processor 801, the transceiver 802, and the memory 803 communicate with each other through an internal connection path, to transfer a control signal and/or a data signal. The memory 803 is configured to store a computer program. The processor 801 is configured to invoke the computer program from the memory 803 and run the computer program, to control the transceiver 802 to send or receive a signal.

The processor 801 and the memory 803 may be integrated into one processing apparatus. The processor 801 is configured to execute program code stored in the memory 803 to implement the foregoing functions. During specific implementation, the memory 803 may alternatively be integrated into the processor 801, or may be independent of the processor 801.

It should be understood that, the processor in embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of random access memories (RAM) can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in embodiments of this application, this application further provides a computer program product. The computer program product includes computer program code. When the computer program code is run on a computer, the computer is enabled to perform the method in the embodiment shown in FIG. 5 or FIG. 6.

According to the method provided in embodiments of this application, this application further provides a computer-readable medium. The computer-readable medium stores program code. When the program code is run on a computer, the computer is enabled to perform the method in the embodiment shown in FIG. 5 or FIG. 6.

According to the method provided in embodiments of this application, this application further provides a system, including the foregoing one or more terminal devices, one or more access network devices, and one or more core network devices.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the computer instructions or computer programs are loaded or executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

For ease of understanding, the following describes terms used in a process of describing the solutions in this application.

In embodiments of this application, the "indication" may include a direct indication and an indirect indication, or may include an explicit indication and an implicit indication. Information indicated by using a piece of information (for example, the indication information described above) is referred to as to-be-indicated information. In a specific implementation process, the to-be-indicated information is indicated in a plurality of manners, for example, but not limited to, a manner of directly indicating the to-be-indicated information, for example, indicating the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent.

In embodiments of this application, terms and English acronyms such as public network (PLMN), non-stand-alone non-public network (CAG), stand-alone non-public network (SNPN), radio resource control (RRC), and system information block (SIB) are all examples provided for ease of description, and shall not constitute any limitation on this application. This application does not exclude a possibility of defining another term that can implement a same or similar function in an existing protocol or a future protocol.

In embodiments of this application, "first", "second", "third", and various numeric numbers are merely used for distinguishing for ease of description and are not intended to limit the scope of embodiments of this application. For example, the terms are used to distinguish between different indication information or messages.

In embodiments of this application, the "communication protocol" may be a standard protocol in the communications field, for example, may include an LTE protocol, an NR protocol, and a related protocol applied to a future communications system. This is not limited in this application.

The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

In this application, "at least one" refers to one or more, and "a plurality of" refers to two or more. The term "at least one of the following items (pieces)" or an expression similar to the term indicates any combination of the items, and includes a single item (piece) or any combination of a plurality of items (pieces). For example, at least one of a, b, or c may indicate: a, b, c, a-b, a-c, b-c, or a-b-c, where a, b, and c may be singular or plural.

Sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to achieve the objectives of the solutions of the embodiments.

In addition, function units in embodiments of this application may be integrated into one processing unit, or each of the units may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a terminal device, a first non-public network with which the terminal device requests to set up a radio resource control (RRC) connection, and determining another non-public network that is deployed in a same cell of an access network device as the first non-public network based on the another non-public network having a same type as the first non-public network;
   generating, by the terminal device, first indication information, wherein the first indication information comprises respective identity information of the first non-public network and the another non-public network; and
   sending, by the terminal device, the first indication information to the access network device.

2. The method according to claim 1, wherein the identity information of the first non-public network and the another non-public network comprises an index of each of the first non-public network and the another non-public network.

3. The method according to claim 1, wherein the first non-public network and the another non-public network rely on a same public land mobile network (PLMN).

4. The method according to claim 1, wherein the identity information of the first non-public network comprises an index of the first non-public network, and the identity information of the another non-public network comprises an identity of the another non-public network.

5. The method according to claim 1, wherein the identity information of the first non-public network and the another non-public network comprise identities of the first non-public network and the another non-public network, and public land mobile network identities in the identities of the first non-public network and the another non-public network are the same.

6. The method according to claim 1, wherein the first indication information is carried in an RRC setup complete message.

7. A terminal device, comprising:
   at least one processor; and
   a memory coupled to the at least one processor, the memory comprising instructions that, when executed by the at least one processor, cause the terminal device to perform operations comprising:
      determining a first non-public network with which the terminal device requests to set up a radio resource control (RRC) connection, and determining another non-public network that is deployed in a same cell of an access network device as the first non-public network based on the another non-public network having a same type as the first non-public network;
      generating first indication information, wherein the first indication information comprises respective identity information of the first non-public network and the another non-public network; and
      sending the first indication information to the access network device.

8. The terminal device according to claim 7, wherein the identity information of the first non-public network and the another non-public network comprises an index of the first non-public network and the another non-public network.

9. The terminal device according to claim 7, wherein the first indication information is carried in an RRC setup complete message.

10. The terminal device according to claim 7, wherein the first non-public network and the another non-public network rely on a same public land mobile network (PLMN).

11. The terminal device according to claim 7, wherein the identity information of the first non-public network and the another non-public network comprise identities of the first non-public network and the another non-public network, and public land mobile network identities in the identities of the first non-public network and the another non-public network are the same.

12. An access network device, comprising:
    at least one processor; and
    a memory coupled to the at least one processor, the memory comprising instructions that, when executed by the at least one processor, cause the access network device to perform operations comprising:
       receiving first indication information sent by a terminal device, wherein the first indication information comprises respective identity information of each non-public network of a plurality of non-public networks, the plurality of non-public networks comprise a first non-public network and another non-public network, and the first non-public network is a network with which the terminal device requests to set up a radio resource control (RRC) connection;

determining second indication information based on the first indication information, wherein the second indication information indicates the plurality of non-public networks;

sending the second indication information to a core network device;

receiving third indication information sent by the core network device, wherein the third indication information indicates the first non-public network; and determining, based on the third indication information, that the network that the terminal device requests to access in the plurality of non-public networks is the first non-public network.

13. The access network device according to claim 12, wherein the second indication information comprises the respective identity information of each non-public network of the plurality of non-public networks.

14. The access network device according to claim 12, wherein the second indication information comprises the first indication information.

15. The access network device according to claim 12, wherein the plurality of non-public networks correspond to a cell of the access network device.

16. The access network device according to claim 12, wherein a content of the second indication information is different than a content of the first indication information.

17. The access network device according to claim 12, wherein the identity information of the first non-public network and the another non-public network comprises an index of the first non-public network and the another non-public network.

18. The access network device according to claim 12, wherein the instructions, when executed by the at least one processor, cause the access network device to perform further operations comprising:

determining a connection status between the first non-public network and the terminal device.

19. The access network device according to claim 18, wherein the instructions, when executed by the at least one processor, cause the access network device to perform further operations comprising:

determining, based on the connection status, whether to allow a new terminal device to access the first non-public network.

20. The access network device according to claim 18, wherein the instructions, when executed by the at least one processor, cause the access network device to perform further operations comprising:

allocating a resource to the terminal device in the first non-public network based on the connection status.

* * * * *